United States Patent [19]

Emma et al.

[11] Patent Number: 5,434,985
[45] Date of Patent: Jul. 18, 1995

[54] SIMULTANEOUS PREDICTION OF MULTIPLE BRANCHES FOR SUPERSCALAR PROCESSING

[75] Inventors: Philip G. Emma, Danbury, Conn.; Joshua W. Knight, Mohegan Lake; James H. Pomerene, Chappaqua, both of N.Y.; Thomas R. Puzak, Ridgefield, Conn.

[73] Assignee: International Business Machines Corporation, Armonk, N.Y.

[21] Appl. No.: 928,851

[22] Filed: Aug. 11, 1992

[51] Int. Cl.6 ............................................. G06F 9/38
[52] U.S. Cl. ................................. 395/375; 395/775; 364/261.3; 364/261.7; 364/263.1; 364/262.4; 364/259.2; 364/DIG. 1
[58] Field of Search ............... 395/375, 775, 650, 800, 395/425

[56] References Cited

U.S. PATENT DOCUMENTS

| | | | |
|---|---|---|---|
| 4,430,706 | 2/1984 | Sand | 395/375 |
| 4,477,872 | 10/1984 | Losq et al. | 395/375 |
| 4,679,141 | 7/1987 | Pomerene et al. | 395/375 |
| 4,691,277 | 9/1987 | Kronstadt et al. | 395/375 |
| 4,763,245 | 8/1988 | Emma et al. | 395/375 |
| 4,764,861 | 8/1988 | Shibuya | 395/375 |
| 4,853,840 | 8/1989 | Shibuya | 395/375 |
| 4,858,104 | 8/1989 | Matsuo et al. | 395/375 |
| 4,881,170 | 11/1989 | Morisada | 395/375 |
| 4,901,233 | 2/1990 | Liptay | 395/375 |
| 4,974,154 | 11/1990 | Matsuo | 395/375 |
| 4,984,154 | 1/1991 | Hanatani et al. | 395/375 |
| 4,991,080 | 2/1991 | Emma et al. | 395/375 |
| 5,163,140 | 11/1992 | Stiles et al. | 395/425 |
| 5,175,827 | 12/1992 | Morisada | 395/375 |
| 5,276,882 | 1/1994 | Emma et al. | 395/700 |
| 5,287,467 | 2/1994 | Blaner et al. | 395/375 |
| 5,297,281 | 3/1994 | Emma et al. | 395/650 |
| 5,317,702 | 5/1994 | Morisada | 395/375 |
| 5,333,283 | 7/1994 | Emma et al. | 395/375 |
| 5,345,571 | 9/1994 | Morisada | 395/375 |
| 5,353,421 | 10/1994 | Emma et al. | 395/375 |
| 5,367,703 | 11/1994 | Levitan | 395/800 |

FOREIGN PATENT DOCUMENTS

3-42722  2/1991  Japan ............................. G06F 9/38

OTHER PUBLICATIONS

L. Liu, "Predict Instruction Flow Based on Sequential Segments," *IBM Technical Disclosure Bulletin*, vol. 33, No. 11, Apr., 1991.

Primary Examiner—Gopal C. Ray
Attorney, Agent, or Firm—Sterne, Kessler, Goldstein & Fox; Richard M. Ludwin

[57] ABSTRACT

System and method for predicting a multiplicity of future branches simultaneously (parallel) from an executing program, to enable the simultaneous fetching of multiple disjoint program segments. Additionally, the present invention detects divergence of incorrect branch predictions and provides correction for such divergence without penalty. By predicting an entire sequence of branches in parallel, the present invention removes restrictions that decoding of multiple instructions in a superscalar environment must be limited to a single branch group. As a result, the speed of today's superscalar processors can be significantly increased. The present invention includes three main embodiments: (1) the first embodiment is directed to a simplex multibranch prediction device, that can predict a plurality of branch groups in one cycle and provide early detection of wrong predictions; (2) the second embodiments is directed to a duplex multibranch prediction device that can detect divergence in a predicted stream, and provide redirection (correction) within the stream; and (3) the third embodiment is directed to an n-plex multibranch prediction device, that can predict n multiplicity of branch predictions simultaneously and provide an early detection of wrong predictions as well as correction of wrong predictions.

27 Claims, 7 Drawing Sheets

|  | 1 | 2 | 3 | 4 | 5 | 6 | 7 | 8 | 9 | 10 | 11 |
|---|---|---|---|---|---|---|---|---|---|---|---|
| DEC | I1 | I2 | I3 | I4 | BR | | | TARG | J1 | J2 | J3 |
| AGEN | | I1 | I2 | I3 | I4 | BR | | | TARG | J1 | J2 |
| CACHE | | | I1 | I2 | I3 | I4 | BR | | | TARG | J1 |
| EXEC | | | | I1 | I2 | I3 | I4 | BR | | | TARG |

CYCLE #

Fig. 1

Symbolic Program

| Address | Instruction | Executed Triples of Branch Groups |
|---|---|---|
| A | Instr A0 | A B C |
| A+1 | Instr A1 | B C D |
| ⋮ | ⋮ | C D E |
| A+$n_a$−1 | Go To B | D E A |
| ⋮ | ⋮ | E A B |
| D | Instr D0 | A B C |
| D+1 | Instr D1 | B C D |
| ⋮ | ⋮ | C D E |
| D+$n_d$−1 | Go To E | D E A |
| ⋮ | ⋮ | E A B |
| X | Instr X0 | A B C |
| X+1 | Instr X1 | B C D |
| ⋮ | ⋮ | C D E |
| X+$n_x$−1 | Go To Y | D E A |
| ⋮ | ⋮ | E A B |
| B | Instr B0 | A B X |
| B+1 | Instr B1 | B X Y |
| ⋮ | ⋮ | X Y A |
| B+b | If <Cond> Go To C | Y A B |
| ⋮ | ⋮ | A B X |
| B+$n_b$−1 | Go To X | B X Y |
| ⋮ | ⋮ | X Y A |
| E | Instr E0 | Y A B |
| E+1 | Instr E1 | A B X |
| ⋮ | ⋮ | B X Y |
| E+$n_e$−1 | Go To A | X Y A |
| ⋮ | ⋮ | Y A B |
| Y | Instr Y0 | A B C |
| Y+1 | Instr Y1 | B C D |
| ⋮ | ⋮ | C D E |
| Y+$n_y$−1 | Go To A | D E A |
| ⋮ | ⋮ | E A B |
| C | Instr C0 | A B C |
| C+1 | Instr C1 | B C D |
| ⋮ | ⋮ | ⋮ ⋮ ⋮ |
| C+$n_c$−1 | Go To D | |

Fig. 3

SIMULTANEOUS PREDICTION OF MULTIPLE BRANCHES FOR SUPERSCALAR PROCESSING

DESCRIPTION

1. Technical Field

The present invention relates generally to a system and method for dynamically and simultaneously predicting the outcome of a sequence of branches. More particularly, the present invention relates to a system and method for predicting a sequence of multiple disjoint instruction segments simultaneously, and for generating the corresponding multiplicity of instruction-fetch addresses to a parallel memory system which provides the instruction sequences to a superscalar processor that can decode and execute multiple instructions in parallel.

2. Background Art

In nominal instruction flow, instructions are decoded in sequence, i.e., instructions are fetched and decoded from sequential locations in memory. A branch instruction is an instruction that causes a disruption in this flow, i.e., a taken branch causes decoding to be discontinued along the sequential path, and resumed starting at a new location in memory. The new location in memory is called the branch-target address. Since instruction fetching is overlapped with the decoding and execution of other instructions, branches degrade pipeline performance.

For example, consider a pipeline whose stages are: i) instruction decode (denoted DEC); ii) address generation (denoted AGEN) for operand addresses, or in the case of branch instructions, for branch target addresses; iii) cache access (denoted CACHE) to fetch operands, or in the case of branch instructions, to fetch branch-target instructions, and iv) execute (denoted EXEC) to perform the functional operation on the input operands as specified by the instruction. FIG. 1 shows an example of instruction flow in this pipeline.

As shown in FIG. 1, a new instruction can be decoded on every cycle such that four instructions can be in some phase of operation simultaneously. For example, on cycle #4, instructions I1–I4 are all being processed by the pipeline. When the branch instruction is decoded on cycle #5, further decoding stops. The branch-target address must be computed by AGEN, and the target instruction (denoted TARG) must be fetched from CACHE before it can enter the pipeline.

In this example, the branch instruction (BR) causes two empty slots to appear in the pipeline. These slots appear during cycles 9 and 10 of the EXEC phase in FIG. 1. These are cycles during which no useful work is being done by the processor, hence these cycles represent performance degradation.

The particular branch instruction used in this example is the least severe of the taken branches: it is called an unconditional branch, since it unconditionally transfers control from the branch instruction (BR) to the target instruction. (TARG). That is, at the time that the branch instruction is decoded, it is known that the transfer of control to TARG will take place. A more costly branch instruction in terms of performance is the conditional branch instruction: this instruction specifies that control is to be transferred to TARG only if some condition is met. The condition is usually determined by the outcome of some instruction that precedes the branch.

A conditional branch instruction would cause a nominal penalty of one additional cycle in the example above, since a conditional branch must complete execution (EXEC) to determine whether control is to be transferred to TARG. If it is determined by EXEC that control is not to be transferred to TARG, then the instruction that is to be decoded following the branch is the next-sequential (by address) instruction which follows the branch. Thus, even when a conditional branch instruction is not taken, there is still a nominal delay of three cycles associated with the branch in this example.

Note that if it can be determined at decode time that a conditional branch instruction will not be taken, then there is no penalty associated with the branch instruction, i.e., the next sequential instruction can be decoded immediately following the decode of the branch instruction. However, if it is determined at decode time that the branch instruction will be taken, then there is still a two-cycle penalty associated with the branch, i.e., the target address must be generated and the target instruction must be fetched, but the cycle in which the branch is executed is saved.

Mechanisms that attempt to predict the outcomes of conditional branches at decode time are called "decode-time prediction mechanisms." If such a mechanism predicts correctly, it will save three cycles for branches that are not taken, and one cycle for branches that are taken in the pipeline above. One particular type of decode-time predictor is called the "Decode History Table" (DHT) as described in U.S. Pat. No. 4,477,872, by Losq et al., and in U.S. Pat. No. 4,430,706, by Sand.

The DHT is a table of entries, where an entry is accessed based on a transformation (hash or truncation) on the bits that compose the address of a branch instruction. The entry itself comprises a single bit: the bit is set if the corresponding branch instruction was taken the last time that it was executed, otherwise the bit is not set. When a conditional branch instruction is decoded, the DHT is accessed with the address of the branch instruction. If the DHT entry is set, then it is guessed that the branch will be taken; the target address is generated, and the target instruction is fetched, and decoded on the third cycle following the decode of the branch instruction (thereby saving one cycle of delay). If the DHT entry is not set, then it is guessed that the branch will not be taken; the next-sequential instruction is decoded on the cycle following the decode of the branch instruction (thereby saving three cycles of delay). If it is found that the DHT predicted erroneously (i.e., the prediction did not agree with the branch outcome as computed in EXEC), then the corresponding entry is corrected.

Thus, a decode-time prediction mechanism offers an opportunity to avoid all penalty associated with not-taken branches as well as the execution-time penalty (typically one cycle) for taken branches. The reduction in branch penalty is dependent upon the accuracy of the particular decode-time mechanism used. However, even a decode-time mechanism having 100% accuracy cannot eliminate all branch penalty.

Specifically, whenever there is a taken branch, there is a penalty equal to the time to generate the target address and fetch the target instruction. Therefore, the only way to reduce branch penalty even further is to anticipate taken branches and to fetch target instructions prior to the time that the branch instructions are actually encountered by the decoder. Mechanisms that attempt to do this are called "prefetch-time prediction mechanisms."

Implicit in the discussion above is the assumption that an autonomous instruction-prefetching engine exists. In the absence of a prefetch-time prediction mechanism, a simple prefetch engine may comprise: i) a simple incrementer used to step through sequential instruction addresses, ii) an instruction buffer for holding sequential instructions to be decoded by the instruction decoder, iii) a means for using the sequential addresses produced by the incrementer to fetch sequential blocks of instructions from the cache and place them in the instruction buffer, and iv) a means for the processor to supply a new starting address (e.g., a branch-target address) to the incrementer in the event of a taken branch instruction.

By "autonomous," it is meant that the prefetch engine is free-running and relatively independent of the instruction decoder. Hence, in the absence of taken branches the instruction buffer will always contain next-sequential instructions to be decoded by the instruction decoder, and there will be no penalty for correctly guessed conditional branches that are not taken.

A prefetch-time prediction mechanism is a mechanism that is incorporated into the prefetch engine (as opposed to a decode-time mechanism, which operates in conjunction with the decoder). A prefetch-time mechanism must autonomously redirect instructions prefetching down a branch-target path immediately following the prefetch of a predicted taken branch. By so doing, the prefetch-time mechanism ensures that the instruction buffer contains the branch target instruction at the time that the branch instruction is decoded. If successful in this endeavor, then the branch target instruction can be decoded immediately following the decode of the branch instruction. Thus, a prefetch-time mechanism eliminates all branch penalty, even for taken branches, when it predicts correctly.

Most, if not all, prefetch-time prediction mechanisms are variations on the "Branch History Table" (BHT) as first described in U.S. Pat. No. 3,559,183, by Sussenguth. This is the prefetch-time analog of the Decode History Table described above. That is, the BHT is a table of entries, where an entry is accessed based on a transformation (hash or truncation) on the bits that compose the address of the block of instructions being prefetched.

The entry itself is much more complex than a DHT entry for three reasons. First, the BHT mechanism operates "blindly" at prefetch time, i.e., it merely fetches blocks of instructions without the benefit of being able to examine the content of these blocks, i.e., without the assistance of an instruction decoder. Second, and very importantly, the fetch quantum is a "block" of instructions that is not necessarily aligned on instruction boundaries, and therefore may contain multiple instructions and instruction fragments; the quanta are not single instructions. Third, the BHT mechanism must output a predicted target address when it predicts the presence of a taken branch within a block.

Thus, a BHT entry must be able to identify that its associated block of instructions contains a taken branch, based on the processor's having previously encountered a taken branch within that block. Further, it must be able to identify where within the block the taken branch instruction resides, since the particular branch instruction may or may not be relevant to current instruction fetching depending on where the block is entered, i.e., depending on current branch activity. Finally, it must specify the branch target address, so that prefetching can be immediately redirected down the target path should the particular branch be relevant to the current prefetch activity.

When the processor encounters a branch instruction that is found to be taken, it creates a BHT entry based on the address of the branch. The entry itself will contain the branch target address. If the particular section of code that contains that branch is ever reencountered, then the BHT entry is able to cause prefetching to be redirected to the historical target address at the time that the branch instruction is prefetched.

When the BHT redirects prefetching, it also enqueues information regarding this action (e.g., the address at which it "believes" there is a taken branch, and the target address of the branch) at the processor. As the processor subsequently executes the code that has been prefetched, it has three opportunities to determine whether or not the BHT was correct. If the BHT correctly anticipated the branch, then there is no penalty associated with the branch. Otherwise, there may be a severe penalty associated with having made an incorrect prediction. (The terms "guess" and "prediction" are used interchangeably and are synonymous in the art.)

There are three points in the processor pipeline at which a branch wrong-guess (BWG) may be detected. These points are at decode time (DEC), at address-generation time (AGEN), and at execution time (EXEC).

At decode time (DEC), a branch wrong-guess (BWG) can manifest itself in one of two ways. First, if the decoder encounters an unconditionally taken branch, and the BHT has given no indication of this branch, then it is known that the BHT is wrong. The appropriate action at this point is to execute the branch in the canonical way, and to create a new BHT entry to indicate the presence of the branch. Second, if the BHT has indicated a taken branch at a given address, and the instruction that is decoded at this address is not a branch instruction, then it is known that the BHT is in error. The appropriate action at this point is to delete the offending entry from the BHT, and to abort the redirection in instruction prefetching that was effected by the presence of the entry. Note that in this latter case, the BHT may have caused cycles of penalty to be incurred via redirection of instruction prefetch when there was no branch instruction in the code.

At address-generation time (AGEN), a BWG manifests itself if the target address that is generated is not the same as the target address that was predicted (and enqueued at the processor) by the BHT. The appropriate actions at this point are to correct the target address in the BHT entry, abort the instruction prefetching that was directed down the erroneous target path, and redirect instruction prefetching down the correct target path.

At execution time (EXEC), the only branches that can possibly cause a BWG are conditional branches, since the resolution of the branch condition is performed during EXEC. A BWG occurs if EXEC determines that the branch is taken when the BHT gave no indication of such, or if EXEC determines that the branch is not taken when the BHT indicated that the branch would be taken. In either case, the appropriate actions are to update the BHT to indicate the new action of the branch and to redirect instruction prefetch in accordance with the new action.

Thus far, the discussion has been restricted to pipelined processors that decode instructions one-at-a-time.

It has been shown that branch instructions are a major disruptive force to pipeline flow, and that a class of history-based prediction mechanisms can eliminate much of the delay caused by branches.

In superscalar processors, multiplicities of instructions are decoded simultaneously (e.g., see Johnson, M., *Superscalar Processor Design*, Prentice Hall, Chapters 1-2, (1991) incorporated herein by reference). The performance implications of branches are even more severe in this arena. Specifically, in order to sustain multiple instruction-decodes per cycle, it is necessary to sustain multiple instruction-fetches per cycle. Since branches are the principle source of uncertainty in the instruction fetching process, good branch prediction is a requirement for reasonable superscalar design.

Further and even more importantly, most programs have a branch instruction on the average of every 3 to 5 instructions. Since this is an average, and the distribution is not necessarily uniform, there are frequent instances of code that contain a branch every 1 to 2 instructions. Since branches are this pervasive in general programs, a truly robust superscalar processor must be able to predict more than one branch instruction simultaneously, and to initiate the appropriate instruction-prefetching.

The importance of branch prediction as it relates to instruction fetching is illustrated by the abstract of "Limits on Multiple Instruction Issue," by Michael D. Smith, Mike Johnson, and Mark A. Horowitz in *Computer Architecture News*, Vol. 17, No. 2, April 1989, pp. 290-302, which states that:

This paper investigates the limitations on designing a processor which can sustain an execution rate of greater than one instruction per cycle on highly-optimized, nonscientific applications. We have used trace-driven simulations to determine that these applications contain enough instruction independence to sustain an instruction rate of about two instructions per cycle. In a straightforward implementation, cost considerations argue strongly against decoding more than two instructions in one cycle. Given this constraint, the efficiency in instruction fetching rather than the complexity of the execution hardware limits the concurrency attainable at the instruction level.

In the "Future Directions" section of the paper, the authors conclude:

The real difficulty lies in providing the instruction bandwidth required by the execution unit given the frequency of branches and the random alignment of instructions in memory. Techniques used to sustain fetch bandwidth requirements in typical pipelined RISC processors do not provide an adequate solution for superscalar architectures.

The conclusion that instruction-fetching bandwidth limits multiple-decode is substantiated further in "Single Instruction Parallelism is Greater Than Two," by Michael Butler, Tse-Yu Yeh, Yale Patt, Mitch Alsup, Hunter Scales and Michael Shebanow, *Computer Architecture News*, Vol. 19, No. 3, pp. 276, 286, May 1991. The abstract states that:

Recent studies have concluded that little parallelism (less than two operations per cycle) is available in single instruction streams. Since the amount of available parallelism should influence the design of the processor, it is important to verify how much parallelism really exists. In this study, we model the execution of the SPEC benchmarks under differing resource constraints. We repeat the work of the previous researchers, and show that under the hardware resource constraints they imposed, we get similar results. On the other hand, when all constraints are removed except those required by the semantics of the program, we have found degrees of parallelism in excess of 17 instructions per cycle. Finally, and perhaps most important for exploiting single instruction stream parallelism now, we show that if the hardware is properly balanced, one can sustain from 2.0 to 5.8 instructions per cycle on a processor that is reasonable to design today.

In this study, the authors only process one branch per cycle, but in the "Conclusions" section, the authors state that:

"Allowing multiple branches per cycle would increase the amount of available parallelism,"

and further state:

Our results of 2.0 to 5.8 instructions per cycle come from a restricted data flow engine that has a limited window size and issue rate, consistent with what is reasonable today. As levels of integration and bandwidth increase, window sizes and issue rates will increase correspondingly. In the limit, our unbounded window size and issue rate machine (the UDF) shows instructions per cycle in the 17 to 1165 range. While we are not suggesting that this is possible (yet), we expect numbers well in excess of 5 instructions per cycle.

This would clearly require predicting more than one branch, and fetching more than one branch-group per cycle. A branch-group is a sequence of instructions whose addresses are sequential, i.e., it is a non-disjoint sequence.

Therefore, a truly robust superscalar processor must be able to predict more than one branch instruction simultaneously, and to initiate the appropriate instruction-prefetching.

DISCLOSURE OF INVENTION

A conditional branch instruction is an instruction that causes a disruption in the straight-line execution of a program based on the outcome of a previous calculation. If the branch instruction is taken, then the next instruction that is executed is not the instruction that sequentially follows the branch instruction; instead, it will come from another part of the program.

In traditional processors that decode only one instruction per cycle, branch instructions have significant performance implications for two reasons. First, the processor is typically delayed pending the outcome of the calculation that is used to resolve the branch. Second, when the branch is taken, a disruption occurs in the pipeline between instruction fetching and instruction execution, since instruction fetching is nominally a next-sequential process. There is extensive existing art relating to the prediction of single branches in the instruction stream, allowing some of these delays to be reduced or eliminated in single-decode processors.

In the field of "superscalar processors," an attempt is made to decode multiplicities of instructions simultaneously. Since branches are pervasive in typical programs, and can occur as frequently as every other instruction in some programs, attempts at building superscalar processors have been limited to date.

A survey of the literature reveals that it is well understood that the intrinsic presence of branch instructions prevents the practical implementation of superscalar processors that decode more than two or three instructions per cycle except in a few very special cases. Although this limitation and the reason for it are well understood, there have been no proposed satisfactory solutions to the problem thus far. Many practitioners accept the interbranch distance as a fundamental limit to multiple decoding.

The present invention is a new mechanism that solves the problems mentioned above. The present invention provides a means for simultaneously predicting the outcome of multiple branches per cycle in an executing program. The multiplicity of branches that are predicted form a logical sequence of branches that occur in the program. By predicting an entire sequence of branches in parallel, the present invention removes the old restriction (discussed above) that the decoding of multiple instructions must be limited to a single branch group.

As a result, not only does the present invention drastically improve the performance of superscalar processing, but it is a prerequisite invention for very high degrees of multiple decoding, i.e., it enables a new level of superscalar processing that was previously assumed to be impossible.

The present invention performs the simultaneous prediction of multiple branches that logically form a sequence. It further initiates the multiple disjoint instruction-fetches that compose the predicted branch sequences.

The present invention implements two conceptual elements that must be present to perform reliable multiprediction and multiprefetching. First, a MultiBranch History Table (MBHT) mechanism maintains entries that provide information about multiple branch groups, i.e., an MBHT entry describes a sequence of branch groups by storing the branch and target address of two or more branch instructions in each entry. Second, since historical branch prediction is not perfect, the predictive accuracy of a predicted branch sequence decreases geometrically with the length of the sequence. Therefore, the present invention maintains a high accuracy via multiple MBHT mechanisms that are searched in parallel with different offsets into the predicted sequence to detect divergence within the predicted sequence as early as possible.

Generally, to predict and prefetch n branch groups simultaneously, an MBHT entry provides information about a sequence of n branches. Additionally, n or fewer MBHT mechanisms are searched in parallel: one MBHT per branch group for some subset of the n branches. The parallel search provides an early recovery mechanism in the event that the multiple tables indicate divergence within the predicted stream.

The present invention includes three main embodiments: (1) the first embodiment is directed to a simplex multibranch prediction device that can predict a plurality of branch groups in one cycle and provide early detection of wrong predictions; (2) the second embodiment is directed to an n-plex multibranch prediction device, that can predict a multiplicity of n branch instructions simultaneously and provide an early detection of wrong predictions as well as correction of wrong predictions; and (3) the third embodiment is directed to a duplex multibranch prediction device that can detect divergence in a predicted stream, and provide redirection (correction) within the stream.

The structure and operation of the third embodiment, the duplex multibranch prediction device, will now be summarized. The duplex multibranch predicting device simultaneously predicts a plurality of branch instructions. It is coupled to an instruction cache of a superscalar processor. The predictions are used to fetch branch groups of instructions to be placed in the instruction cache.

The duplex multibranch predicting device includes the following elements: a primary pre-fetch address register, a primary multiple-branch history table, a secondary multiple-branch history table, a comparator, and an update queue.

The primary multibranch history table predicts target addresses of a first plurality of branch instructions simultaneously, based on the execution history of the first plurality of branch instructions.

The secondary multibranch history table lags at least one branch instruction behind the primary multibranch history table. The secondary multibranch history table predicts target addresses of a second plurality of branch instructions simultaneously, based on an execution history of the second plurality of branch instructions. Additionally, the secondary multibranch history table is used to check for divergence in predictions made by the primary multibranch history table.

The comparator is coupled to the primary multibranch history table and to the secondary branch history table. The comparator compares predictions made by the primary multibranch history table with predictions made by the secondary multibranch history table to detect divergence.

Lastly, the update queue is coupled to the primary branch history table and to the secondary branch history table. The update queue is used for updating the execution history of the primary multibranch history table and the secondary multibranch history table, based on outcome of sequences of branch instructions executed by the superscalar processor.

In summary, a major feature of the present invention is to predict a multiplicity of future branches simultaneously, to enable the simultaneous fetching of multiple disjoint program segments. Predicting multiplicities of branches is essential to overcoming the existing limits of instruction-level parallelism. This multiplies the maximum processing speed of a computer significantly. For example, it could increase the present limits of executing 2-5.8 instructions per cycle as found by Butler et al., to their projected, 17-1165 instructions per cycle.

Additionally, the present invention detects divergence of incorrect branch predictions and provides correction for such divergence without penalty.

The foregoing and other objects, features, and advantages of the invention will be apparent from the following more particular description of the preferred embodiments of the invention, as illustrated in the accompanying drawings.

BRIEF DESCRIPTION OF DRAWINGS

FIG. 1 shows a hypothetical instruction flow in a 4-stage pipeline.

FIG. 3 shows a program containing sequences of branch groups, and branch group triples that result from its execution.

BEST MODE FOR CARRYING OUT THE INVENTION

Defining Terms

The following is a short list of terms and their corresponding meanings:

| Term | Meaning |
| --- | --- |
| Branch Address | The address at which the branch instruction resides. |
| Target Address | The address to which control is passed when a branch is taken. |
| Branch Group | A sequence of instructions whose addresses are sequential, i.e., it is a non-disjoint sequence. Each branch group begins with a branch-target instruction, and continues with all instructions that are sequential to and including the first taken branch. |
| Disjoint | Refers to a group of instructions which do not all reside in sequential locations within program memory. |
| Triple | A general term, used to specify a sequence of 3; i.e., a trio of taken branches, a sequence of 3 branch groups, or starting addresses of three branch groups which will be executed in order. |
| Branch-wrong-guess | The event when the branch prediction mechanism makes an erroneous prediction of the outcome of a branch instruction. |
| Steady-state operation | Operation where all predictions correspond to the branches actually taken upon execution. |
| ENDOP | Refers specifically to the completion of execution of any instruction. |

I. Overview

There are three main embodiments that describe the present invention: the first embodiment is directed to a simplex multibranch prediction device; the second embodiment is directed to a general n-plex multibranch history device with divergence detection and redirection; and the third embodiment is directed to a specific duplex multibranch prediction device with divergence detection and redirection.

Following the "Best Mode for Carrying Out the Invention" section is an appendix section. Appendix A is a table that illustrates cycle-by-cycle operation of the duplex multibranch prediction device.

A branch group is a sequence of instructions whose addresses are sequential, i.e., it is a non-disjoint sequence. The first instruction of a branch group is a branch-target instruction. A branch instruction causes instruction sequencing to jump from one branch group to the next.

Each branch group begins with a branch-target instruction, and continues with all instructions that are sequential to the target instruction up to and including the first taken branch. The branch that terminates the branch group jumps to a new branch group or the same branch group starting address. A general multiple-instruction sequence comprises a sequence of branch groups, i.e., it comprises a sequence of disjoint instruction-sequences.

Figure 2:
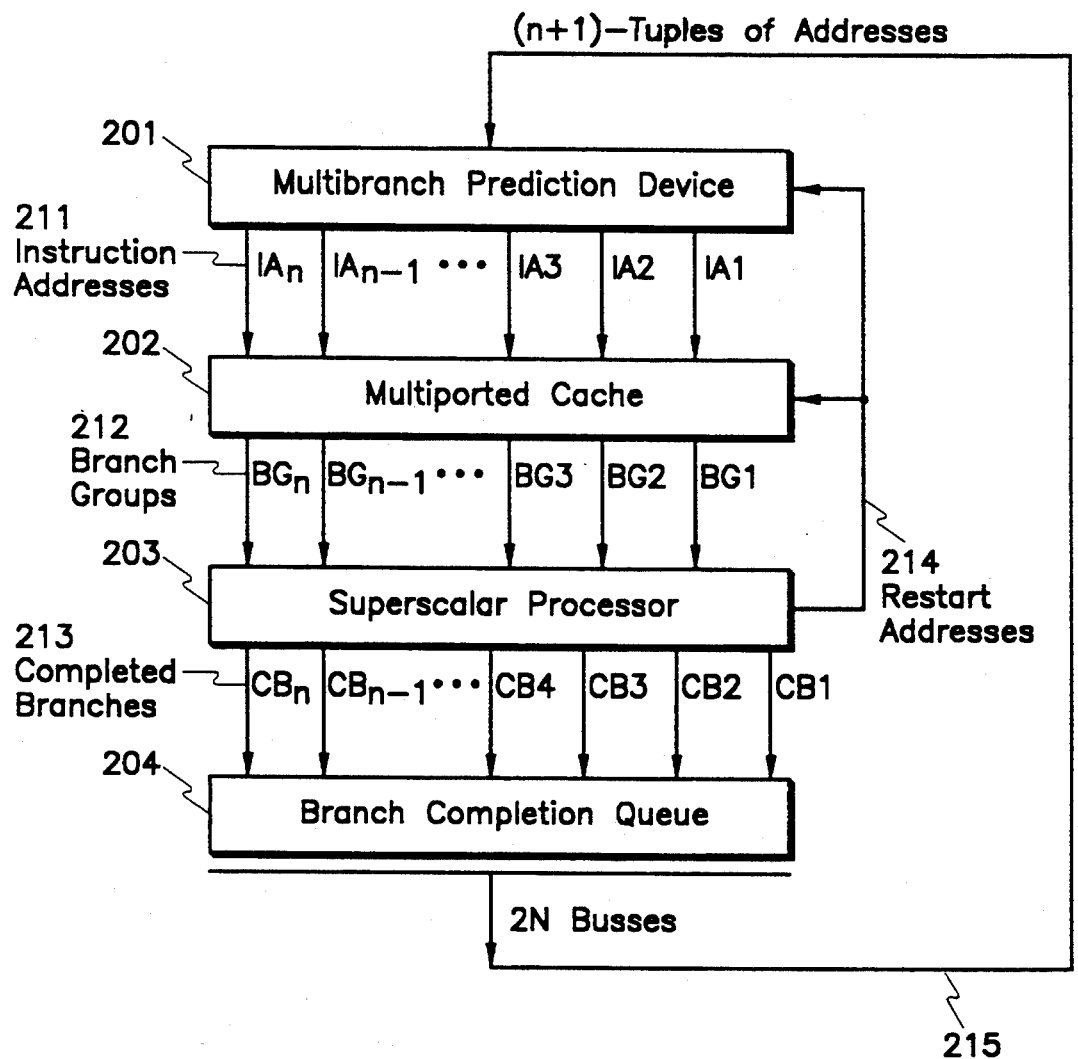
FIG. 2 illustrates a high-level block diagram of a superscalar processor and a multiported cache that is driven by a multibranch prediction device which can sustain very high bandwidth instruction fetching.

FIG. 2 illustrates a high-level block diagram of a computer based environment in which the present invention operates. Referring to FIG. 2, a superscalar processor ("processor") 203 is capable of decoding and executing multiple instructions on each processing cycle. In prior art, the number of instructions that could be decoded on each cycle was limited to the number of instructions in a branch group. The present invention, to be described below, overcomes this limitation.

A long multiple-instruction sequence generally contains multiple branch groups. In order to sustain the decoding of long multiple-instruction sequences on each cycle, it is necessary to fetch the constituent branch groups of each sequence on each cycle. Therefore, instruction busses must be sufficiently wide to permit entire branch groups to be fetched. Additionally, since the constituent branch groups must be fetched from disjoint locations in memory simultaneously, a multiported cache 202 is required to service multiple disjoint instruction-fetches in parallel. The structure and operation of a multiported cache 202 is well known to those skilled in the art.

One preferred embodiment of the present invention is a Multibranch Prediction Device 201. The Multibranch prediction device 201 predicts the multiple branches per cycle that connect the branch groups. The Multibranch prediction device 201 also initiates the fetches of these branch groups from the multiported cache 202.

When processor 203 initiates a program or recovers from a branch-wrong-guess (BWG), processor 203 provides a restart address on its address bus 214. This is the starting address of the first branch group of the instruction stream that is to be processed. The address is transmitted to the multiported cache 202 and to the multibranch prediction device 201 on address bus 214.

The first branch group is fetched from the multiported cache 202, by the processor 203 on one of the n instruction busses 212 (where n is an integer). Each of these n busses is capable of transmitting an entire branch group in a single cycle, i.e., the busses 212 provide an extremely wide connection.

While the first branch group is being fetched from the multiported cache 202, the restart address on bus 214 is also used to effect a look-up in the multibranch prediction device 201. The device 201 predicts the n branch groups that will follow the first branch group. The multibranch prediction device 201 predicts all n groups in a single cycle, and it provides the starting instruction address of each group, to the multiported cache 202 on the n address busses 211.

Note that the multibranch prediction device 201, the multiported cache 202, and the superscalar processor 203 form a pipeline. On the first cycle described above, the first branch group is fetched from the multiported cache 202 while the next n branch groups are predicted by the multibranch prediction device 201. The first branch group is transmitted to the processor 203 on one of the busses 212, and the addresses of the next n branch groups are transmitted to the multiported cache 202 on the n address busses 211.

On a second cycle, the instructions of the first branch group are decoded by the superscalar processor 203 while the next n branch groups are all fetched simultaneously from the multiported cache 202. These n branch groups are transmitted to the processor 203 on busses 212. At the same time, the multibranch prediction device 201 iterates on itself to predict the next n branch groups.

On a third cycle and every cycle thereafter, n branch groups are decoded simultaneously by the superscalar processor 203. The decoding rate of n branch groups per cycle is sustained until the processor 203 determines that the multibranch prediction device 201 has mispredicted a branch. In this event, the process restarts with a new instruction address as described above for the first cycle.

As the superscalar processor 203 completes the execution of instructions, it places information about each completed branch in a branch completion queue 204. The processor 203 can enqueue information about a sequence of n branches on every cycle. The processor 203 transmits the information to the branch completion queue 204 on the n busses 213.

The branch completion queue (queue) 204 dequeues information on a first-in-first-out (FIFO) basis. The queue 204 must be able to hold as many as 2n entries. Note that a sequence of n+1 entries represents a single branch group followed by n successive branch groups. Therefore, whenever n+k entries are enqueued, k−1 sequences of n+1 branch groups are described by those entries.

Whenever n+k entries are enqueued, the associated k−1 sequences of (n+1)-tuples are transferred to the multibranch prediction device. 201 on a subset of the 2n busses 215. After the transfer is complete, the entire queue 204 is shifted right k−1 positions so that k−1 oldest entries are discarded. Operation of a queue is well understood by those skilled in the art.

To summarize, FIG. 2 illustrates the general case in which n branch groups are predicted per cycle. One preferred embodiment details the operation of multibranch prediction device for n=2, i.e., a specific embodiment for a multibranch prediction device that predicts two branches per cycle. The point n=2 is chosen as the simplest case that demonstrates the invention, but it is understood by those skilled in the art that this is not a limitation.

II. An Example Program Sequence

FIG. 3 is a symbolic illustration of a typical program. The program contains branch groups, each of which is a short group of sequential instructions that ends in a taken branch. Each taken branch causes a jump to the beginning of a new branch group.

For example, there is a branch group that begins at symbolic address A and contains $n_a$ instructions. The last instruction in the branch group is a taken branch that goes to a new branch group that begins at symbolic address B.

At an offset of b instructions from address B, there is a conditional branch that may be taken to address C, or it may fall through to a next sequential instruction. If the conditional branch falls through, there is an unconditional branch at an offset of $n_{b-1}$ instructions from address B that is taken to address X.

The other branches in this program are: from the branch group that begins at address D to the branch group that begins at address E; from the branch group that begins at address X to the branch group that beings at address Y; from the branch group that beings at address E to the branch group that begins at address A; from the branch group that begins at address Y to the branch group that begins at address A; and from the branch group that beings at address C to the branch group that beings at address D.

As previously mentioned, this embodiment demonstrates the case where n=2, i.e., in this description of the operation of the device, 2 branches are predicted per cycle. Then for this case, (n+1)-tuples are 3-tuples, also called triples. The right most column in FIG. 3 lists the addresses associated with the triples of branch groups that occur as the program in the left column executes.

For example, the first triple listed is ABC. This triple represents that the branch group that begins at address A was followed by a sequence of the two branch groups that begin at addresses B and C, respectively. The second triple represents that B is followed by C and D, respectively.

For the triples shown, it is assumed that the conditional branch at address B+b is taken on its first three executions, not taken on its next three executions, and then taken again. Therefore, the program flow is ABCDE, for three iterations, followed by ABXY for three iterations, followed again by ABCDE. This means that the triple ABC changes to ABX, and the triple BCD changes to BXY after three iterations, and then both triples change back. The remaining triples, CDF, DEA, EAB, XYA, and YAB, do not change.

The following description of the multibranch prediction device uses the example in FIG. 3 to demonstrate its operation.

III. A Simplex Multibranch Prediction Device

Figure 4:
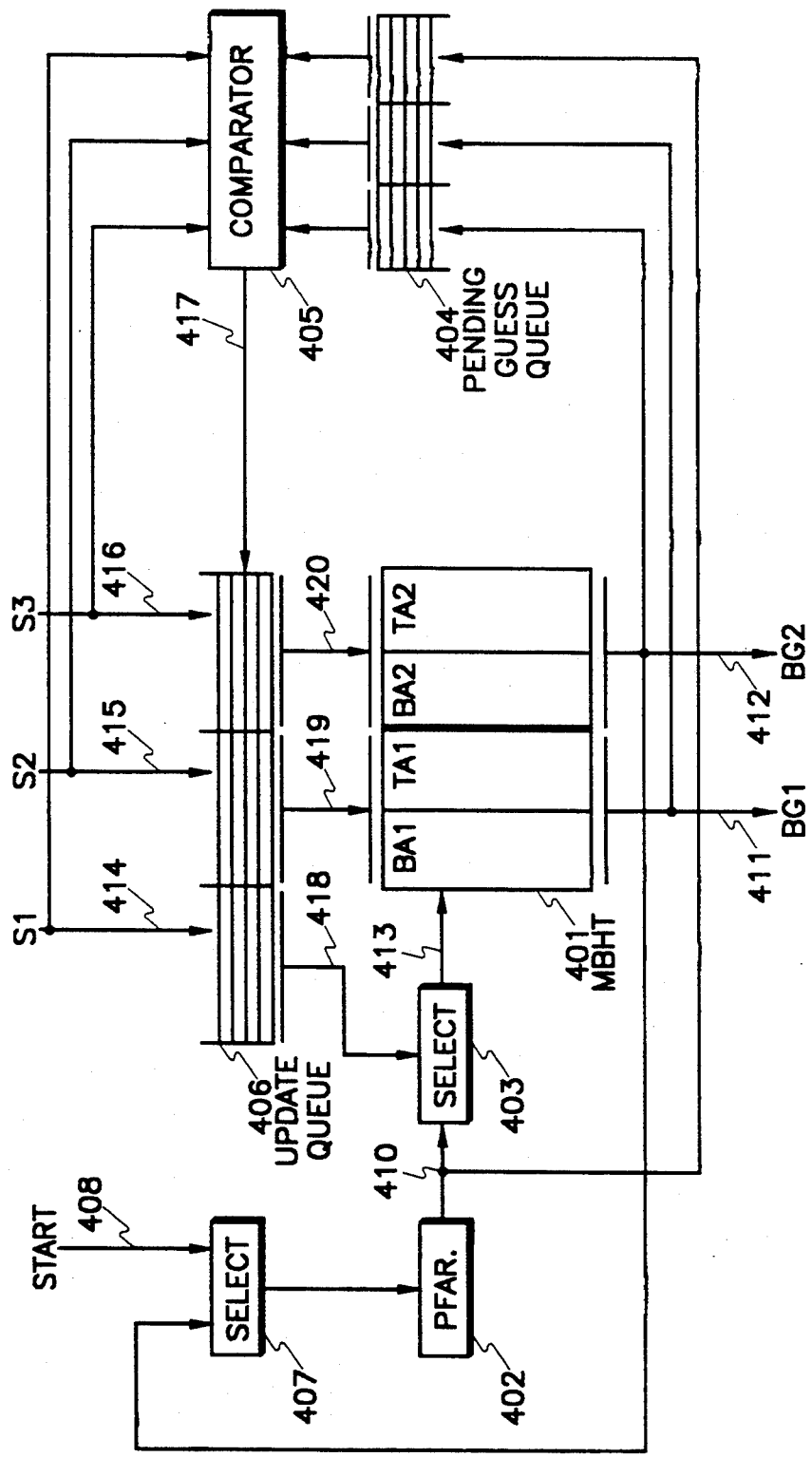
FIG. 4 illustrates a block diagram of a simplex multibranch prediction device, that can predict a minimum of 2 branch groups in one cycle and provide early detection of wrong predictions.

FIG. 4 illustrates a block diagram of a simplex multibranch prediction device that can predict two branches per cycle. This is the simplest device that illustrates the present invention. This device is called "simplex" because it comprises a single table. The single table in this device is called a multibranch history table 401, denoted MBHT.

Each entry in the MBHT 401 contains information about a sequence of two branch groups. Two outputs 411 and 412 from the MBHT 401 characterize the pair. The first output 411 describes a first branch group, denoted BG1, and the second output 412 describes a second branch group, denoted BG2.

Each branch is characterized by two addresses, e.g., BG1 comprises the pair of addresses BA1 and TA1. The first address is the address of the branch instruction, BG1. The second address is the address of the corresponding target instruction, TA1. The compound entry <BG1,BG2> contains four addresses, and is stored in a location in the table that is determined by the first address of its corresponding triple. Please note that BG1 and BG2 in FIG. 4 corresponds to instruction addresses IAn in FIG. 2.

For example, the program in FIG. 3 contains the triple ABC. Execution of this triple would cause an entry to be made in MBHT 401. The location of the entry would be determined by address A. For this particular program, the fields of the entry corresponding to the triple ABC are: BA1=A+na−1; TA1=B; BA2=B+b and TA2=C.

Referring to FIG. 3, if the MBHT 401 were subsequently searched using address A, this entry would be found. This search can be implemented using combinational logic to compare the address held in PFAR 402 to the address fields of entries in MBHT 401. The entry indicates that there is a taken branch at address A+na−1 that goes to address B, and another taken branch at address B+b that goes to address C. The entry thus contains sufficient information to represent transitions from A to B and from B to C, i.e., it exactly describes the locations of all instructions necessary to execute the triple ABC.

As pictured in FIG. 4, the MBHT 401 is direct mapped, but it should be understood that it can be implemented as a set associative structure. Such implementations are well understood in the industry. Further, it should be understood that within such a structure, not all of BA1 must be stored; rather, a portion of BA1 is used to locate the entry within the structure, thereby rendering that portion of it implicit to its location. Further, since BA2 is known to be a short offset from TA1, it is obvious to the routineer that BA2 could be represented as that offset. These are all implementation tradeoffs that have to do with economy of table space; none of them are central to the subject invention.

The MBHT 401 is searched based on the address in a prefetch address register 402, denoted PFAR. When the MBHT 401 is being read, a selector 403 routes the address in PFAR 402 to the address inputs 413 of MBHT 401. The address in PFAR 402 is the starting address of an instruction sequence, and if a corresponding entry is found in MBHT 401, then the outputs BG1 411 and BG2 412 are addresses of branch groups that are believed to follow in the instruction sequence.

Note that if an entry is found in MBHT 401, then an address triple on lines 410, 411, and 412 represents a predicted triple of branch groups. The predicted triple is enqueued on a pending guess queue 404 where the triple is subsequently used to filter unnecessary updates.

Recall from FIG. 2 that triples are transmitted from the branch completion queue 204 to the multibranch prediction device 201 along busses 215. These busses 215 enter the multibranch prediction device 201 as lines 414, 415, and 416 in FIG. 4, i.e., these busses entering FIG. 4 transmit the addresses of branch group triples.

As completed triples arrive on busses 414, 415, and 416, a comparator circuit 405 compares them to predicted triples in pending guess queue 404. If the comparator circuit 405 determines that the pending guess queue 404 does not contain a completed triple whose addresses are on lines 414, 415, and 416, then it infers that the triple is not known to the MBHT 401, and it enqueues the arriving triple on the update queue 406 after receiving an activation signal 417 from comparator circuit 405. If the comparator circuit 405 determines that the pending guess queue 404 does contain the completed triple on lines 414, 415, and 416, then the corresponding entry is deleted from the pending guess queue 404, and the arriving triple is not enqueued on the update queue 406.

If there are entries enqueued in the update queue 406, they are transferred to the MBHT 401 on cycles when the MBHT 401 is not being searched. To make this transfer, selector circuit 403 routes a first address of the triple 418 to the address inputs 413 of the MBHT 401, and the remaining addresses of the triple are routed to MBHT 401 via data inputs 419, and 420 of the MBHT 401 where they are stored.

In steady-state operation in which all predictions are correct, the device in FIG. 4 drives itself. That is, as long as branch triples are predicted correctly, the third address of each triple 412 is routed through a selector circuit 407 (the selector circuit acts as a 2:1 multiplexer) and loaded into PFAR 402 where it is used as a starting address to search the MBHT 401 on the next cycle.

From FIG. 2, when the processor 203 initiates a program or recovers from a branch-wrong-guess (BWG), it provides a restart address on its address bus 214. This bus 214 is connected to the multibranch prediction device 201 and corresponds to START input 408 shown in FIG. 4. Referring back to FIG. 4, START input 408 is a starting address for a first branch group of the instruction stream that is to be processed.

Therefore, following a power-on sequence, or following a branch wrong guess, selector circuit 407 is set to route the START input 408 to the PFAR 402. Once the device has started up, the selector circuit 407 is switched to route output 412 to the PFAR 402 as described above for steady-state operation. (Switching can be performed a number of ways. For example, the processor can send a control signal on restart address bus 214, shown in FIG. 2, to selector 407. Other methods are possible and would be readily apparent to those skilled in the art.)

For example, consider the program in FIG. 3 as it interacts with the device in FIG. 4. When the program begins from address A, selector circuit 407 causes PFAR 402 to be loaded from the START input 408, which should be receiving address A. The MBHT 401 is searched, and assuming that the triple ABC has been stored there, outputs 411 and 412 will produce addresses D and E respectively.

On the third cycle (clock cycle or processor cycle), the PFAR 402 is loaded with address E, and operation continues as described above to produce output pairs AB, CD, EA, BC, etc., on successive cycles. Steady-state operation continues until there is a branch wrong guess. Following a branch wrong guess, the device is restarted from the START input 408. A more detailed description of the operation follows in a later section, including updating the MBHT 401.

IV. An n-plex Multibranch Prediction Device

The subject invention comprises two elements that should be present to perform reliable multiprediction. First, and by definition, a multiprediction device must provide a multiplicity of branch predictions simultaneously. This aspect of the invention has already been described in the previous subsections. Second, for the multipredictor to perform accurately and reliably, the device should contain elements to detect and correct divergences in the multiplicity of branch predictions.

A device that predicts branch behavior based on past history can predict with a low margin of error, but not perfectly, i.e., it is inevitable that some of the predictions are wrong. In a device that predicts one branch at a time, mispredictions decrease accuracy straightforwardly. In a multipredictor, the accuracy degenerates geometrically with the length of the sequence being predicted, i.e., mispredictions have a more dramatic impact on multipredictors.

The discussion thus far, with reference to FIG. 4, has been limited to a device for which n=2, i.e., simplex, but with no capability to detect divergence in the second predicted branch. FIG. 4 could be generalized to a device that provides n predictions per cycle by expanding the entries in the MBHT 401 to include n address pairs: $<BA1,TA1>$, $<BA2,TA2>$, ..., $<BAn,TAn>$. This generalization would still lack the capability for detecting divergence within the predicted n-tuple.

Figure 5:
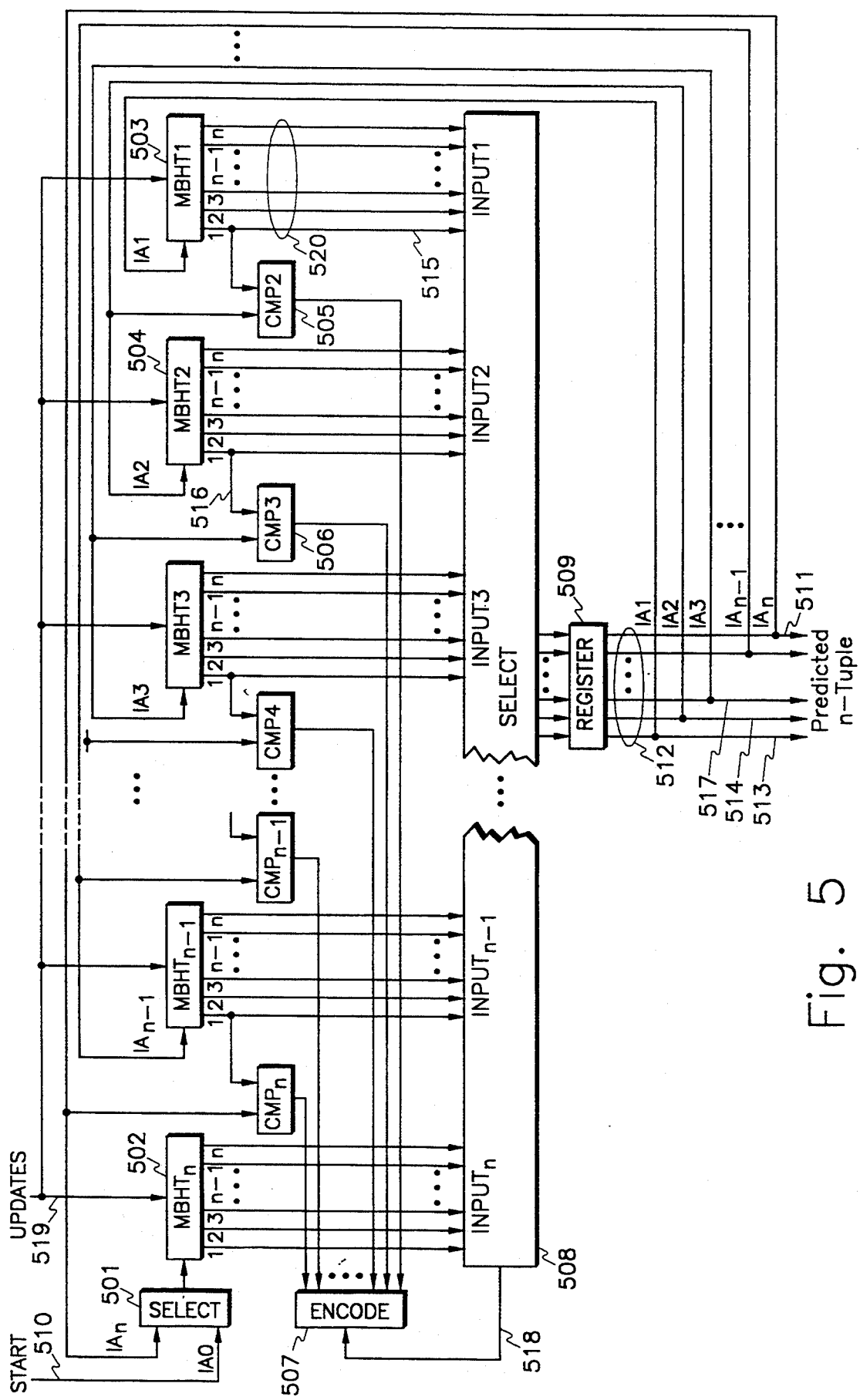
FIG. 5 illustrates a block diagram of a n-plex multibranch prediction device, that can predict n branches simultaneously and that provides an early detection of wrong predictions as well as correction of wrong predictions.

FIG. 5 illustrates a block diagram of a general n-plex multibranch prediction device that provides n predictions per cycle, and that also provides a means for early detection and correction of each of those n predictions. FIG. 5 represents the most general implementation that carries out the elements of the subject invention.

FIG. 5 contains n copies of the multibranch prediction device depicted in FIG. 4, with each of those devices expanded to provide n simultaneous predictions as described above.

Specifically, each of the boxes MBHTn, . . . , MBHT2, MBHT1 in FIG. 5 contains the device shown in FIG. 4, with the entries in the MBHT 401 expanded to include n address pairs. The device in FIG. 4 is further modified for use in FIG. 5 by removing the selector circuit 407 and the feedback path 412 from the device, and routing the primary input 408 directly to the PFAR 402. This input 408 is driven in an appropriate manner by the remaining circuitry in FIG. 5. A description of the operation of the n-plex multibranch prediction device in FIG. 5 follows.

From FIG. 2, when the processor 203 initiates a program or recovers from a branch-wrong-guess (BWG), it provides a restart address on its address bus 214. This bus 214 going to the multibranch prediction device 201 is the START input 510 in FIG. 5. This is the starting address of the first branch group of the instruction stream that is to be processed.

Therefore, following a power-on sequence, or following a branch wrong guess, selector circuit 501 is set to route the START input 510 to the PFAR (not shown) contained in MBHTn 502. Once the device has started up, the selector circuit 501 is switched to route output instruction address IAn 511 to MBHTn 502 so that the table becomes self-driven as was described for FIG. 4.

MBHTn 502 is called the "Primary Multibranch History Table," and its role is to provide predictions that are n branches further into the instruction stream than the previous predictions. This is why the nth predicted instruction address IAn 511 is routed back to the input of the primary table 502 on each cycle.

If it were the case that the primary MBHT 502 never mispredicted a branch, the n−1 remaining MBHTs and selection circuitry would not be required. That is, FIG. 4 can be obtained directly from FIG. 5 by deleting all hardware from FIG. 5 except the input selector 501 and the primary MBHT 502. The n−1 remaining MBHTs and selection logic in FIG. 5 provide early detection and correction for divergence in the branch sequence predicted from the primary MBHT prediction device 502.

The output of FIG. 5 is an n-tuple of predicted instruction addresses 512, labeled IA1, IA2, . . . , IAn. Instruction address IAn 511 is the nth address of the n-tuple, and it is used to drive the primary MBHT 502 as described above. Each of the remaining n−1 instruction addresses drives a distinct secondary MBHT.

For example, instruction address IA1 513 drives secondary MBHT1 503. Note that the original source of IA1 513 is the first branch target address of the n-tuple predicted by the primary MBHT 502. The output of the secondary table MBHT1 503 is an n-tuple of branch target addresses that are predicted as successive to IA1 513.

Simultaneously, instruction address IA2 514 drives secondary MBHT2 504. Note that the original source of IA2 514 is the second branch target address of the n-tuple predicted by the primary MBHT 502. The output of the secondary table MBHT2 504 is an n-tuple of branch target addresses predicted as successive to IA2 514.

Comparator circuit 505 compares address IA2 514 to the first instruction address output 515 of the secondary MBHT1 503. Recall that since secondary MBHT1 503 is driven by IA1 511, its first instruction address output 515 should be the same as IA2 514 as predicted by the primary MBHT 502. That is, the first output 515 of MBHT1 503 should be the same as the second output 514 of MBHTn 502.

Similarly, the first output 516 of MBHT2 504 should be the same as the third output 517 of MBHTn 502. A comparator circuit 506 makes this determination. Each of the n−1 secondary MBHTs have a comparator circuit which compares the first output address of the n-tuple predicted by the associated secondary MBHT to the appropriate address of the n-tuple that was predicted by the primary MBHT 502 on the previous cycle. If all MBHTs contain consistent information, all comparator outputs will indicate that all addresses match.

If any comparator does not find a match, then the secondary MBHT that is associated with that comparator contains information that is inconsistent with the primary MBHT 502. In this event, the information in the secondary MBHT is assumed to be correct, and the information in the primary MBHT 502 is assumed to be faulty.

This assumption is partially based on the arguments given in the third paragraph of this subsection, i.e., the first output of each table is inherently more accurate than the kth (each successive) output. For each secondary MBHT, it is the first output of the MBHT that is compared to the appropriate output, but not the first output, of the primary MBHT 502. Thus, the secondary MBHTs are given priority over the primary MBHT in the event of a miscompare.

The encoder circuit 507 determines whether there are any miscompares. If there are no miscompares, then the encoder output 518 causes the selector circuit 508 to route the outputs of the primary MBHT 502 to the register 509 where they are stored for use on the next cycle.

IF there is exactly one miscompare, then the encoder circuit 507 causes the selector circuit 508 to route the outputs of the associated secondary MBHT to the register 509. For example, if the comparator 505 determines that a first output 515 of MBHT1 503 is not the same as IA1 513 as predicted on the previous cycle, then the outputs of MBHT1 503 are routed through the selector 508 to the register 509.

If there are multiple miscompares, then the first of the MBHTs that miscompares is given priority, since that MBHT indicates the first point of divergence in the predicted stream. The first of the secondary MBHTs is the right most table as it is pictured in FIG. 5. For example, if both comparators 505 and 506 indicate miscompares, the encoder circuit 507 will give priority to MBHT1 503.

Note that the register 509 that holds the selected n-tuple is redundant with respect to the PFARs of the n MBHTs, i.e., it holds the n PFAR contents. This register need not be present in the FIGURE, but is shown this way to clearly distinguish predictions made on subsequent cycles.

Also note that the "UPDATES" input 519 in FIG. 5 is included for completeness. This is the set of busses that are used to transmit the executed (n+1)-tuples for storage in the MBHTs, i.e., these are the busses 215 in FIG. 2. The update operation was not described in this subsection, but was described in the previous subsection, and will be described in more depth in the next subsection.

The secondary MBHT's provide two functions. First, the first address output of an n-tuple provides a means for detecting divergence in the n-tuple predicted by the primary MBHT. For example, output 515 of MBHT1 503 is compared to IA2 514 to determine whether the second address predicted by the primary MBHT 502 has diverged.

The second function provided by a secondary MBHT is that it can provide the replacement n-tuple(s) if its first address does not match the associated address from the primary MBHT. For example, MBHT1 503 provides the n-tuple output 520 if the first address of the n-tuple 515 does not match IA1 514 from the primary MBHT 502.

That is, the first address output of a secondary MBHT provides divergence detection, and the remaining n−1 addresses provide immediate correction to the divergence. Therefore, the last n−1 addresses are not necessary in an implementation that only requires divergence detection. Divergence correction can be provided by the primary MBHT 502 on a subsequent cycle once the divergence has been detected. A more economical, but slightly slower implementation would have secondary MBHTs that only output a single address.

A further reduction to the design would be to eliminate some of the secondary MBHTs. That is, it is not necessary to provide divergence detection at every branch in the n-tuple; it may be sufficient to detect divergence on every other branch. This is strictly a cost-performance trade-off. A general k-plex multiprediction device is constructed from k<n MBHTs. If k=1, there is no divergence detection.

A final note is that in theory, all MBHTs should contain identical information, since all of the information comes from the same processor. Were this the case, there would never be miscompares, and the Secondary MBHTs would not be needed.

In fact, the MBHTs are finite, have limited set-associatives, have limited porting, etc., so distinct MBHTs will not be able to store identical information. Further, since the executed stream will have breaks and mispredicted branches in it, there will be incomplete information coming in on the update busses 519. That is, it may be advisable to store incomplete tuples in some of the MBHTs; particularly if the secondary MBHTs do not store full n-tuples, as was described above. In practice, the MBHTs will not contain identical information; the extent to which they differ is implementation-dependent.

Figure 6:
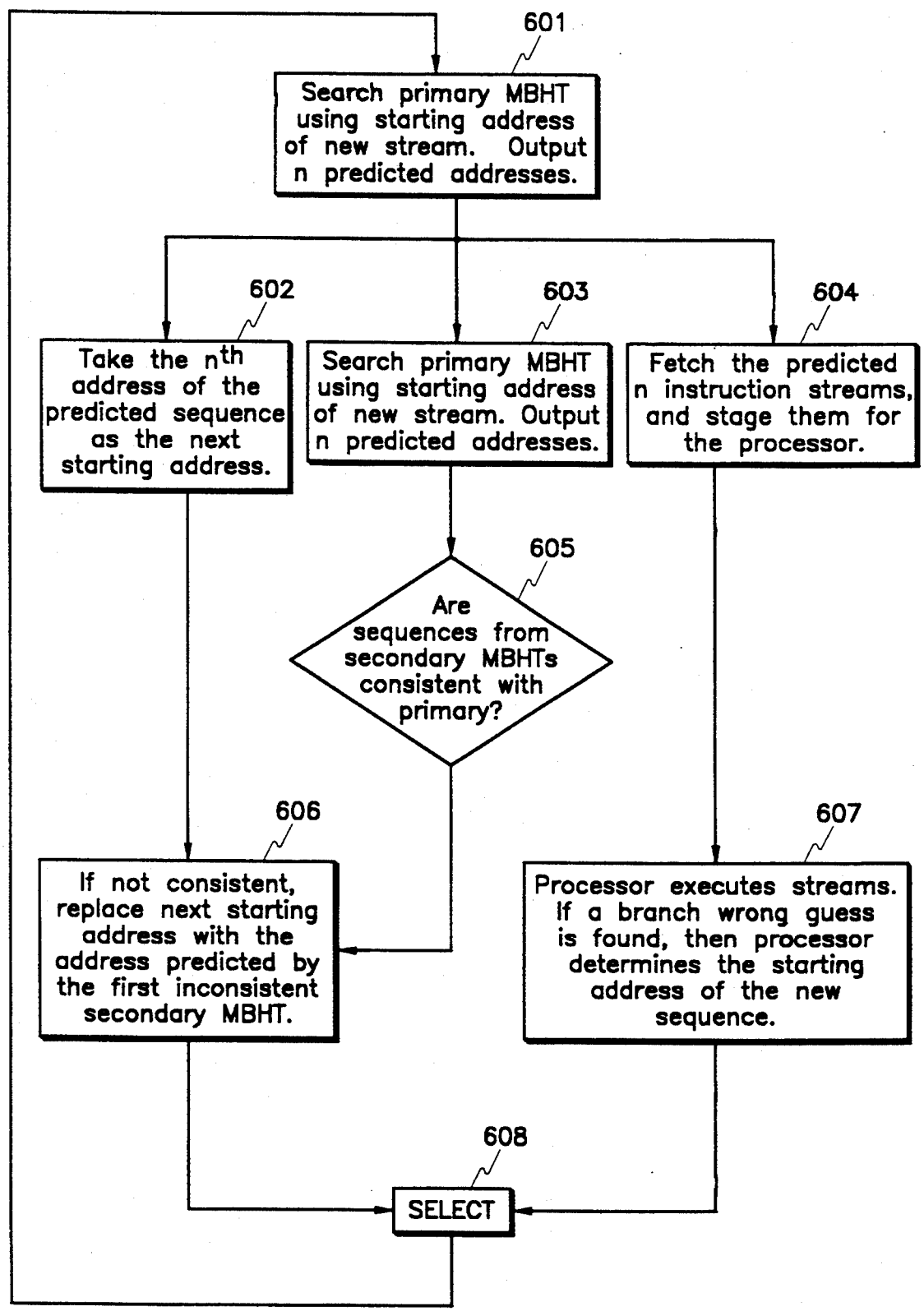
FIG. 6 is a flow chart illustrating a high-level logical flow of a generic multiprediction device.

FIG. 6 shows the high-level logic flow for generic multiprediction. In a step 601, the first address of a new instruction sequence is used to search the primary MBHT. This search results in n predicted addresses. These n addresses are used by the next three steps 602, 603, and 604 simultaneously.

In a step 602, the last address of the n-tuple predicted by the previous step 601 is staged as the next starting address that is to be used on the next search of the primary MBHT, i.e., on the next cycle of the first step 601.

Simultaneously in a step 603, the remaining n−1 addresses are used to search secondary MBHTs. Also simultaneously in a step 604, the n addresses that were predicted in a previous step 601 are used to fetch the n instruction streams, and stage them for execution by the processor.

In a decision step 605, the outputs of the secondary MBHTs obtained in the previous step 603 are compared to the outputs obtained from the primary MBHT in the previous step 601. If there is an inconsistency in the predicted streams, t]hen the next starting address is changed in a step 606. The next starting address is chosen to be the one predicted by the first of the MBHTs that differs as is determined in step 605.

Meanwhile in a step 607, the processor decodes and executes the instruction streams that were fetched in a previous step 604. If the actual execution of branches differs from the sequence of branches that was predicted in a previous step 601, then the next starting address is determined by the actual executed sequence in the processing step 607. This substitution is made in a selection step 608 if it is required.

The address selected in the final step 608 is used to restart the process from the initial step 601.

V. Duplex Multibranch Prediction Device

In Section III, simplex multiprediction was described in detail. Simplex multiprediction is the simplest multiprediction scheme, but it does not contain any aspect of divergence detection and redirection. In Section IV, n-plex multiprediction was described in general. This is the most generic multipredictor that contains full divergence detection and correction.

In this section, duplex multiprediction is described in detail. Duplex multiprediction is the simplest example of n-plex prediction, i.e., it is simple enough to describe in detail, yet sufficiently complex to illustrate divergence detection.

Figure 7:
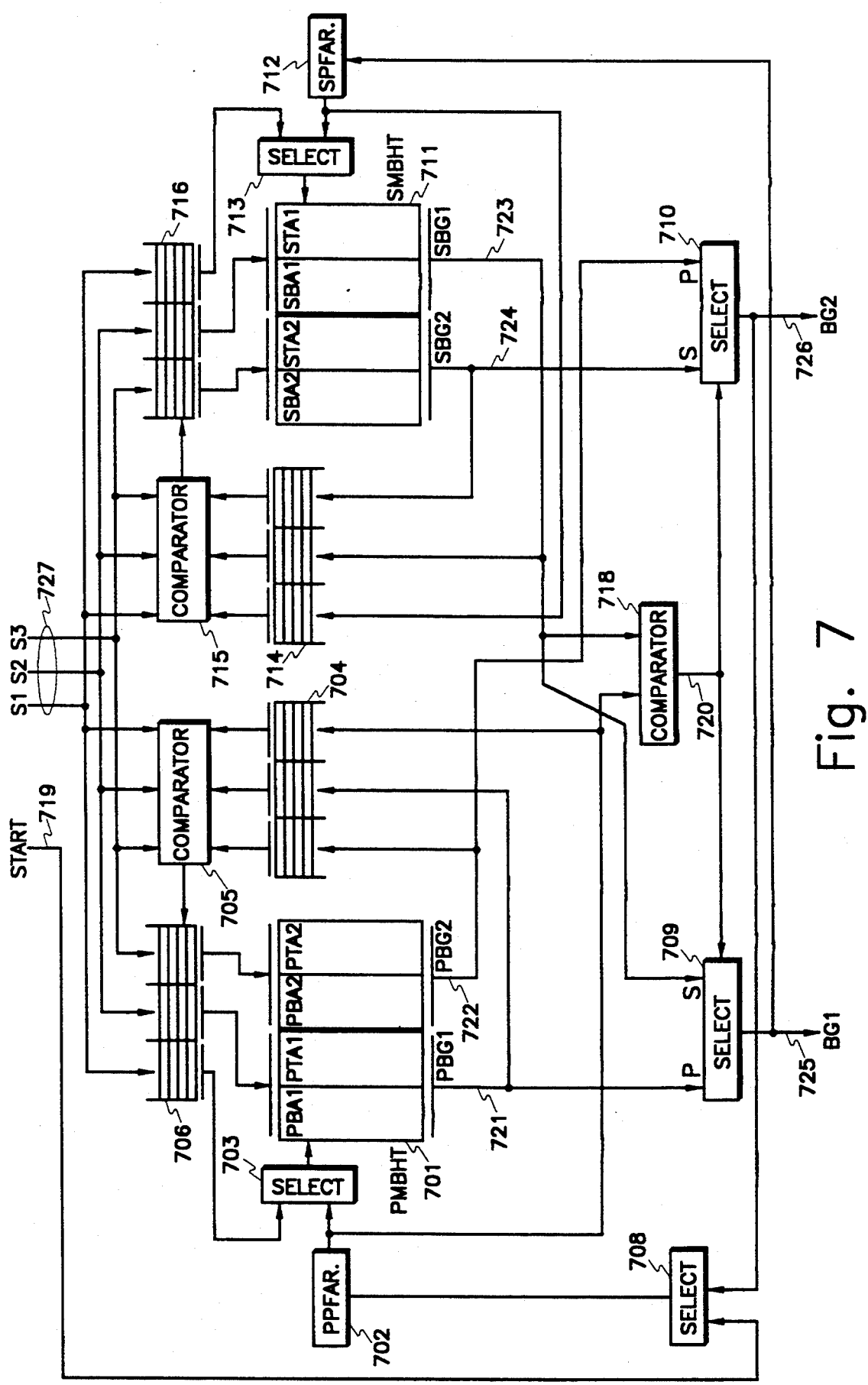
FIG. 7 illustrates a block diagram of a duplex multibranch prediction device that can detect divergence in a predicted stream, and provide redirection (correction) within the stream.

FIG. 7 illustrates a block diagram of a duplex multiprediction device that is capable of predicting two branches per cycle, and is capable of detecting and correcting divergence in the second branch of the predicted pair.

FIG. 7 includes two copies of the simplex multipredictor device shown in FIG. 4, a comparator circuit 718 used for divergence detection, and two selector circuits 709 and 710 used to redirect the predicted stream. The two simplex multipredictor devices are called the primary and secondary multibranch history tables, PMBHT 701 and SMBHT 711, respectively.

It is helpful to compare FIG. 4 with FIG. 7 so that elements of the distinct MBHTs are apparent. First, the actual MBHT 401 in FIG. 4 appears as the two MBHTs, 701 and 711 in, FIG. 7, as was just mentioned. The PFAR 402 that is used to search the MBHT 401 in FIG. 4 appears as a primary and a secondary PFARs, labeled PPFAR 702 and SPFAR 712, respectively, in FIG. 7. The selector circuit 403 in FIG. 4 becomes the two selector circuits 703 and 713 in FIG. 7. The pending guess queue 404 in FIG. 4 appears as the primary and secondary pending guess queues 704 and 714, respectively, in FIG. 7. The comparator associated with the pending guess queue 405 in FIG. 4 appears as the two comparators 705 and 715 in FIG. 7. Finally, the update queue 406 in FIG. 4 appears as the primary and secondary update queues 706 and 716, respectively, in FIG. 7.

The starting input selector 408 in FIG. 4 is the same as the starting input selector 708 in FIG. 7. Recall from the discussion of the n-plex multiprediction that only the primary MBHT receives its input from this selector. The new hardware in FIG. 7 is the comparator 718 and the two selectors 709 and 710 that were already mentioned. A description of the operation of the device in FIG. 7 follows.

From FIG. 2, when the processor 203 initiates a program or recovers from a branch-wrong-guess (BWG), it provides a restart address on its address bus 214. This bus 214 going to the multibranch prediction device 201 is the START input 719 in FIG. 7. This is the starting address of the first branch group of the instruction stream that is to be processed.

Therefore, following a power-on sequence, or following a branch wrong guess, selector circuit 708 is set to route the START input 719 to the PPFAR 702. Once the device has started up, the selector circuit 708 is switched to route output 726 to the PPFAR 702 for steady-state operation.

In steady-state operation, the first address output of the duplex multibranch prediction device, BG1 725, is loaded into SPFAR 712 where it is used to drive the secondary MBHT 711 on the subsequent cycle. At the same time, the second address output of the device BG2 726 is loaded into PPFAR 702 where it is used to drive the primary MBHT 701 on the subsequent cycle.

Using the second address 726 to drive the primary MBHT 701 allows the primary MBHT 701 to stay two branches ahead of the last predicted pair, i.e., the primary MBHT 701 predicts two new branches on each cycle. Using the first address 725 to drive the secondary MBHT 711 causes the secondary MBHT 711 to lag one branch behind the primary MBHT 701.

Therefore, a first output 723 of the secondary MBHT 711 should match a second output 722 of the primary MBHT 701 from the previous cycle. But note that the second output 722 of the primary MBHT 701 from the previous cycle was stored in the PPFAR 702 at the end of that cycle. Therefore, the comparator 718 compares the address from the first output 723 of the secondary MBHT 711 with the address in the PPFAR 702 on every cycle.

As long as the comparator circuit 718 determines that these addresses match, the primary MBHT 701 continues to drive the duplex multibranch prediction device. Specifically, the comparator 718 causes the selectors 709 and 710 to route the outputs 721 and 722 from the primary MBHT 701 to the outputs 725 and 726, respectively, of the duplex multibranch prediction device 700. As explained above, the first output 725 will be used to drive the secondary MBHT 711, and the second output 726 will be used to drive the primary MBHT 701 on the next cycle.

If the comparator circuit 718 determines that the two addresses do not match, then the secondary MBHT 711 will drive the duplex multibranch prediction device on the next cycle. Specifically, the comparator 718 causes the selectors 709 and 710 to route the outputs 723 and 724 from the secondary MBHT 711 to the outputs 725 and 726, respectively, of the duplex multibranch prediction device 700.

This concludes the basic description of the operation of the duplex multibranch prediction device 700. Note that both tables PMBHT 701 and SMBHT 711 are loaded with information about branch group triples from the busses (S1, S2, S3) 727.

The updates to the tables PMBHT 701 and SMBHT 711 work just as they did in the description of the simplex MultiBranch prediction device 400. Very simply, when MBHT 701, 711 makes a prediction, they record the prediction in pending guess queues 704, 714. As executed triples arrive on the busses 727, they are compared to the predicted triples in the pending guess queues 706, 716. If the actual triple does not match the predicted triple, then the actual triple is placed onto the update queue 706, 716. Entries in the update queue are written into MBHTs 701, 711 during idle cycles.

In theory, if both MBHTs 701 and 711 were infinitely large fully associative tables, and both could receive and store all triples completely and in a timely fashion, then there would be no need for the secondary MBHT 711. In practice, the MBHTs 701 and 711 will not always contain consistent information, and divergence will occur in the predicted stream.

VI. Example of Operation of a Duplex Multibranch Predictor

In this section, a detailed description is given of the operation of the device shown in FIG. 7 while running the program shown in FIG. 3. In the program flow, it is assumed that the branch instruction at address B+b in FIG. 3 is taken for the first six iterations, and not taken thereafter. Then the branch groups that are executed are six iterations of ABCDE, followed by multiple iterations of ABXY.

Note that FIG. 7 is not detailed enough to convey the precise operations of its constituent queues, or of the processor pipeline. Since these precise workings determine the exact way in which the device operates, it is necessary to specify them. In other words, queues are generally referred to in FIG. 7 and may be customized for particular application systems. Note that any set of precise rules can be specified, and each precise set may change the general operation of the device, but the basic invention remains the same.

For the purpose of illustration, the following 8 rules are used in 3 different categories:
Operation of the Processor Pipeline:

Rule 1—When a branch instruction is executed, its target address is staged for instruction fetching on the actual execution cycle of the branch.

Rule 2—A branch group is considered to have executed on the cycle immediately following its execution cycle. That is, any triples S1, S2, S3 that are completed by executing the branch group will be sent to the duplex multiprediction device 700 on the cycle immediately following the execution of the branch group.

Rule 3—If there is a secondary MBHT 711 hit on a cycle in which there is a primary MBHT 705 miss, then the outputs of the secondary MBHT 711 are staged to drive the instruction fetching on the following cycle.
Management of the Update Queues, and Updating of the MBHTs:

Rule 4—Assume that there is a mechanism that prevents duplicate entries from being placed into an Update Queue 706, 716. For example, if the Primary Update Queue 706 contains the triple ABC, and a new copy of the triple ABC arrives on the update busses 727, then the new copy will not be placed into the Primary Update Queue 706, even if there is no entry ABC in the Primary Pending Guess Queue 704.

Rule 5—When the processor 203 executes two branch groups simultaneously, this generally results in two triples being transmitted to the duplex multiprediction device 700 simultaneously. Assume that an update queue 706, 716 can only process one triple per cycle, and that there is no buffer present to hold a second triple. Then if two triples arrive simultaneously, the first triple is only sent to the Primary Update Queue 706, and the second triple is only sent to the Secondary Update Queue 716.

Rule 6—Nominally, the MBHT 701, 711 is searched on every cycle, and updates cannot be done at the same time as searches. Therefore, to ensure that updates in the update queue 706, 716 are eventually put into the MBHT 701, 711, updates are given priority for one cycle on the cycle following a miss.

Management of the Pending Guess Queues.

Rule 7—When a triple S2, S2, S3 arrives on the update bus 727 and is compared to all entries in a pending guess queue 704, 714, if at least one match is found in the pending guess queue 704, 714, then the oldest entry that matches is deleted, and all entries that are older than that entry are deleted from the queue.

Rule 8—When the processor 203 discovers that a branch has been guessed incorrectly, all entries in the pending guess queue 704, 714 are deleted.

APPENDIX A illustrates a cycle-by-cycle operation (the first 56 cycles of operation) of duplex multiprediction device 700 shown in FIG. 7 running the program in FIG. 3 subject to the eight rules above. The leftmost columns show the cycle number, starting with 0 and increasing to 55. There are four major subdivisions of the remaining columns.

The first set of columns shows the flow within the superscalar processor 203 and multiported cache 202. The Address Stage column shows the instruction addresses that are staged for fetching on the following cycle. The Cache Access column shows the branch groups that are fetched during the cycle. The Processor operation is shown in two columns: Decode, and Execute. These columns show the branch groups that are decoded and executed during the corresponding cycles. ENDOP group triples are shown in two columns because there can be two triples that ENDOP per cycle, as per Rule 5 above. Note that ENDOP Triples appear on the cycle following the execution of the last branch group of the triple, as per Rule 2 above.

The three remaining subdivisions of columns show the resources within the duplex multibranch prediction device 700. Two of the subdivisions are for the Primary MBHT 700, and the Secondary MBHT 711. The COMPARE column between the two shows the operation of the comparator 718 in FIG. 7 as it compares the first output of the Secondary MBHT 711 to the contents of the PPFAR 702, which nominally contains the second output of the Primary MBHT 701 from the preceding cycle.

The operation of each of the MBHTs 701, 711 is detailed in seven columns per MBHT. The first of the columns is the PFAR 702, 712, which shows the address that is used to search the MBHT 701, 711. The next two columns, BG1 721, 725 and BG2 723, 724, are the two outputs that result from having searched MBHTs 701, 711 with the contents of PFAR 702, 712. Note that the outputs 721, 722 and 723, 724, respectively, become available on the cycles following the loading of the PFAR 702, 712. The remaining four columns show the operation of the four queues 704, 706, 714, 716.

For the Pending Guess Queues 704, 714, and for the Update Queues 706, 716, there is an Enqueue column that shows entries being placed into the queue, and a Dequeue column that shows entries leaving the queue. Typically, triples are enqueued in the Pending Guess Queue on the cycle that the corresponding MBHTs 701, 711 outputs appear. As triples ENDOP at the processor 203, they are used to dequeue matching entries from the Pending Guess Queues 704, 714 on the same cycle. If no matching entries are found, then the ENDOP triples are enqueued in the Update Queue 706, 716 subject to Rule 5 above, i.e., one triple per MBHTs 701, 711.

When MBHTs 701, 711 can accept an update, the corresponding entry is dequeued from its Pending Guess Queues 704, 714 on the same cycle in which the update is done. Note that if the MBHTs 701, 711 are idle when an ENDOP triple is received, the triple is effectively enqueued and dequeued simultaneously as the MBHTs 701, 711 are updated. This is denoted in APPENDIX A by showing the triple in parentheses in both the Enqueue and Dequeue columns on the update cycle, e.g., see the Secondary Update Queue column for cycle #7 in the Appendix.

In this example flow, the first branch group of the program has starting address A. The flow starts on Cycle #0 with instruction address A stated for instruction fetching. Note that the address that is staged for instruction fetching is also used to search the Primary MBHT 701, so the PPFAR 702 is also loaded with the address A on Cycle #0. In this example, it is assumed that both MBHTs 701, 711 start with no valid entries in them.

On Cycle #1, the Cache is accessed, and the branch group at address A is fetched. The outputs of the Primary MBHT 701 also become available. Since the MBHT 701 is empty, the result of the search is a miss; see the PBG1 721 and PBG2 722 columns. Since there is a miss, the multibranch prediction device 700 cannot yet begin to drive the instruction fetching, and the nominal pipeline flow must proceed in a relatively slow fashion.

On Cycle #2 branch group A is decoded, and on Cycle #3 it is executed by the processor 703. As per Rule 3 above, B is discovered as the successor to A on the execution of cycle of A, that is, on Cycle #3. Therefore, the address of B is placed into Address Stage, and is also loaded into the PPFAR 702 on Cycle #3.

Since the MBHTs 701, 711 are still empty, B flows through the pipeline in exactly the same manner as did A. The one exception is that when B executes on Cycle #6 and its successor is found to be C, this represents the first triple of the run, i.e., the sequence ABC has been discovered. Therefore, the triple ABC appears at ENDOP on Cycle #7 as per Rule 2 above. Since this is the only ENDOP triple, Rule 5 is not relevant, and the triple ABC is sent to both MBHTs 701, 711 on Cycle #7.

Note that the Primary MBHT 701 is busy on Cycle #7 because a search was staged for address C on the preceding cycle. Therefore, the arriving triple ABC is placed into the Primary Update Queue 706 on Cycle #7. Since no primary search was staged on Cycle #7, the Primary MBHT 701 is available for an update on Cycle #8. The Output column is labeled "Update-ABC" on Cycle #8 to indicate the update activity. Note that ABC is dequeued from the Update Queue when the update is done. Also note that even if the PPFAR 702 had been loaded on Cycle #7, the update would have been given priority over the search because there was a miss on Cycle #7 as per Rule #6.

The Secondary MBHT 711 is idle on Cycle #7 because searches on the Secondary MBHT 711 are only generated on behalf of Primary MBHT 701 n bits, and there has been no primary hit. Therefore the arriving triple ABC is immediately stored in the Secondary MBHT 711 on Cycle #7. The Output column is labeled "Update-ABC" on Cycle #7 to indicate the update. Also, as mentioned before, the triple ABC is shown in parenthesis being enqueued and dequeued simultaneously from the Secondary Update Queue 716. This notation is used to convey the fact that the entry ABC is not in the queue at the end of the cycle, but the queue is busy during the cycle determining that the entry should not remain in the queue.

Execution of branch groups, and updating of MBHTs 701, 711 with ENDOP triples continues in the same manner through Cycle #15. By Cycle #15, the branch groups A, B, C, D, and E have all been executed, and the triples ABC, BCD, and CDE have been discovered and entered into both tables. On Cycle #15, A is discovered as the successor to E when E executes. Address A is staged for instruction fetching, and is loaded into the PPFAR 702 on this cycle.

This time, searching the Primary MBHT 701 with address A results in a hit on Cycle #16, and the outputs are B and C respectively. This hit is the result of having stored the triple ABC on Cycle #8 above. The hit results in addresses B and C being staged for instruction fetching, address C being loaded into PPFAR 702, and address B being loaded into SPFAR 712 all on Cycle #16. The hit also represents that a guess is made that the sequence ABC is upcoming. Therefore, the triple ABC is placed into the Primary Pending Guess Queue 704.

On Cycle #17, the result of searching the Primary MBHT 701 with address C is the output pair D and E. These addresses are staged for the next instruction fetch, and the triple CDE is enqueued in the Primary Pending Guess Queue 704. The result of searching the Secondary MBHT 711 with address B is the output pair C and D. The first output C is compared to the contents of PPFAR 702, which is also C, so no corrective action is taken. PPFAR 702 is loaded with E, and SPFAR 712 is loaded with D.

Since the triple EAB has not yet occurred, the Primary MBHT 701 search on address E results in a miss on Cycle #18. This ensures that the triple DEA in the primary Update Queue 706 will be entered into the Primary MBHT 701 on Cycle #19 as per Rule #6. Searching the Secondary MBHT 711 on address D results in the output pair E and A. Since there is a primary miss, the output of the secondary table is used to drive the instruction fetching as per Rule #3. Since the secondary table only stays one branch group ahead of the instruction fetching, only the single fetch A is staged on Cycle #18, and A is loaded into PPFAR 702. Note that the A is shown in parenthesis in the PPFAR 712 on this cycle, since it is known that the search on A will be delayed by one cycle because of the update that is to be done as per Rule #6.

On Cycle #19, the processor 203 executes its first simultaneous pair of branch groups, B and C. The Primary MBHT 701 is updated with the triple DEA, and the PPFAR 702 continues to hold address A. Since the Secondary MBHT 711 is idle, it immediately accepts the triple EAB for update as it ENDOPs on this cycle. Since the Primary MBHT is busy updating the triple DEA, the newly arriving triple EAB is enqueued at the update queue 706, 716.

On Cycle #20, the two triples ABC and BCD ENDOP simultaneously. The first triple ABC is sent to the Primary MBHT 701, and the second triple BCD is sent to the Secondary MBHT 711 as per Rule #5. At the Primary MBHT 701, the triple ABC is discovered in the Pending Guess Queue 204, which indicates that the Primary MBHT 701 already has knowledge of the triple. The resulting action is to dequeue ABC from the Primary Pending Guess Queue 704 as per Rule #7. Similarly, at the Secondary MBHT 711, the triple BCD is discovered in the Pending Guess Queue 714, which indicates that the Secondary MBHT 711 already has knowledge of the triple. The resulting action is to dequeue BCD from the Secondary Pending Guess Queue 714 as per Rule #7.

On Cycle #21, the two triples CDE and DEA ENDOP simultaneously. A similar set of actions as for Cycle #20 occur, resulting in CDE being dequeued from the Primary Pending Guess Queue 701, and DEA being dequeued from the Secondary Pending Guess Queue 711. Address E is loaded into PPFAR 702 on Cycle #21.

On Cycle #22, the result of searching the Primary MBHT 701 on address E is a miss. Note that the ENDOP triple EAB has occurred on Cycle #19, and it is present in the Primary Update Queue 706, but the Primary MBHT 701 has been fully utilized since Cycle #15, and the update of EAB has not yet occurred. Thus, the Primary MBHT 701 misses on address E. Note that Rule #6 guarantees that the update will be done on the next cycle; this is the reason for having a Rule #6, or something like it.

On Cycle #23, the Primary MBHT 701 is updated with EAB. From this cycle on, the five triples ABC, BCD, CDE, DEA, and EAB are indicated by both tables, and instruction fetching reaches steady-state. The multibranch prediction device 700 successfully initiates two fetches per cycle for the next eleven cycles, and the processor executes two branch groups per cycle for Cycles #27-34.

On Cycle #34, the seventh execution of the branch group at B occurs, and this time the successor is found to be X, not C as was the case in the first six executions. This represents an incorrect branch prediction, so it causes the pipeline to restart on Cycle #35.

The restart of Cycle #35 is accomplished by staging address X for instruction fetching, clearing the remainder of the pipeline, clearing both pending guess queues 704, 714, and suppressing the outputs 721, 722, 723, 724 of both MBHTs 701, 711. This suppression is denoted by putting parentheses around the outputs in APPENDIX A. The pipeline then begins processing the sequence A, B, X, Y, etc., and the two MBHTs 701, 711 are eventually updated with the new triples.

A point of interest is Cycle #42, in which the Primary MBHT 701 remembers that A is followed by B and C. Note that C is no longer part of the actual sequence. Nonetheless, an instruction fetch is staged for C, and PPFAR 702 is loaded with C while SPFAR 712 is loaded with B.

On Cycle #43, the Secondary MBHT 711 indicates that B is followed by X and Y. Compare circuit 718 detects the divergence, and redirects the instruction fetching in accordance with the Secondary MBHT 711 outputs 723, 724.

Note that the same divergence is detected again on Cycle #48. This is because the actual triple ABX first ENDOPTed on Cycle #35 as the second triple of a pair of triples. The bandwidth limitation of the queues imposed by Rule #5 prevents this triple from being sent to the Primary MBHT 701. The triple ABX is first transmitted to the Primary MBHT 701 on Cycle #46, but because the Primary MBHT 701 is busy, it never gets updated with this triple in the APPENDIX.

Since the Primary MBHT 701 predicts two branch groups ahead per cycle, and since the sequence A, B, X, Y contains four branch groups, the Primary MBHT 701 does not need not know about the triple ABX after this second redirection. From Cycle #48 onward, the Primary MBHT 701 is searched only on addresses Y and B, so the triple BAX is never reencountered by the Primary MBHT 701 in this flow.

From Cycle #48 onward, instruction fetching once again hits the steady-state rate of two branch groups per cycle. Starting from Cycle #51 onward, the processor execution also hits the steady-state rate of two branch groups per cycle. This concludes the example.

While the invention has been particularly shown and described with reference to preferred embodiments thereof, it will be understood by those skilled in the art that various changes in form and details may be made therein without departing from the spirit and scope of the invention.

APPENDIX A

| Clock Cycle | Superscalar Processor 203 ||||| ENDOP ||| Primary MBHT 701 |||||||| Secondary MBHT 711 ||||||||
|---|---|---|---|---|---|---|---|---|---|---|---|---|---|---|---|---|---|---|---|---|---|---|---|
| | Instruction Fetch ||| Processor || Triple1 | Triple2 | PPFAR 702 | Outputs || Pending Guess Q. 704 || Update Queue 706 || COM-PARE 718 | SPFAR 712 | Outputs || Pending Guess Q 714 || Update Queue 716 ||
| | Address Stage | Cache Access | Decode | Execute | | | | | PBG1 721 | PBG2 722 | En-queue | De-queue | En-queue | De-queue | | | SBG1 723 | SBG2 724 | En-queue | De-queue | En-queue | De-queue |
| 0 | A | — | — | — | — | — | A | — | — | — | — | — | — | — | — | — | — | — | — | — | — |
| 1 | — | A | — | — | — | — | — | — | — | — | — | — | — | — | — | — | — | — | — | — | — |
| 2 | B | — | A | — | — | — | B | miss | miss | — | — | — | — | — | — | — | — | — | — | — | — |
| 3 | — | B | — | A | — | — | — | — | — | — | — | — | — | — | — | — | — | — | — | — | — |
| 4 | C | — | B | — | — | — | C | miss | miss | — | — | — | — | — | — | — | — | — | — | — | — |
| 5 | — | C | — | B | — | — | — | — | — | — | — | — | — | — | — | — | — | — | — | — | — |
| 6 | D | — | C | — | ABC | — | D | miss | miss | — | — | ABC | — | — | — | — | — | — | — | — | (ABC) | — |
| 7 | — | D | — | C | — | — | — | Update-ABC | | — | — | — | ABC | — | — | Update-ABC | — | — | — | — | (ABC) |
| 8 | E | — | D | — | BCD | — | E | miss | miss | — | — | BCD | — | — | — | — | — | — | — | — | (BCD) | — |
| 9 | — | E | — | D | — | — | — | Update-BCD | | — | — | — | BCD | — | — | Update-BCD | — | — | — | — | (BCD) |
| 10 | A | — | E | — | CDE | — | A | miss | miss | — | — | CDE | — | — | — | — | — | — | — | — | (CDE) | — |
| 11 | — | A | — | E | — | — | — | Update-CDE | | — | — | — | CDE | — | — | Update-CDE | — | — | — | — | (CDE) |
| 12 | B,C | — | A | — | DEA | — | A,C | B | C | ABC | — | DEA | — | B | Update-DEA | — | C | D | BCD | BCD | (DEA) | — |
| 13 | D,E | B,C | — | A | — | — | E | D | E | CDE | ABC | — | DEA | D | | E | A | DEA | DEA | (DEA) |
| 14 | A | — | B,C | D,E | EAB | BCD | A,C | miss | miss | ABC | CDE | EAB | — | B | Update-EAB | — | C | D | BCD | BCD | (EAB) | — |
| 15 | — | A | — | B,C | ABC | DEA | E | Update-DEA | | CDE | — | — | DEA | D | | E | A | DEA | DEA | EAB |
| 16 | B,C | — | A | D,E | CDE | BCD | A,C | B | C | EAB | ABC | (EAB) | — | B | | C | E | BCD | BCD | (EAB) |
| 17 | D,E | B,C | — | A | EAB | DEA | E | D | E | ABC | CDE | — | EAB | D | | E | B | DEA | DEA | |
| 18 | A | — | B,C | D,E | ABC | BCD | A,C | B | C | BCD | EAB | (EAB) | — | B | | C | E | ABC | BCD | |
| 19 | B,C | A | — | B,C | CDE | DEA | E | D | E | DEA | ABC | — | — | D | | E | B | DEA | DEA | |
| 20 | D,E | B,C | A | D,E | EAB | BCD | A,C | A | B | ABC | EAB | — | — | A | | D | A | ABC | ABC | |
| 21 | A | D,E | B,C | A | ABC | CDE | E | C | D | CDE | BCD | — | — | C | | E | B | CDE | CDE | |
| 22 | B,C | A | D,E | B,C | CDE | DEA | A,C | B | D | EAB | ABC | — | — | B | | D | A | EAB | EAB | |
| 23 | D,E | B,C | A | D,E | EAB | ABC | E | D | E | BCD | DEA | — | — | D | | E | C | BCD | BCD | |
| 24 | A,B | D,E | B,C | A,B | ABC | ABC | B | A | B | DEA | EAB | — | — | A | | D | B | ABC | ABC | |
| 25 | C,D | A,B | D,E | C,D | CDE | — | D | C | D | ABC | BCD | — | — | C | | E | D | CDE | CDE | |
| 26 | E,A | C,D | A,B | E,A | EAB | — | A | E | A | EAB | DEA | — | — | E | | B | A | EAB | EAB | |
| 27 | B,C | E,A | C,D | B,C | BCD | — | C | B | C | BCD | ABC | — | — | B | | D | C | BCD | BCD | |
| 28 | D,E | B,C | E,A | D,E | DEA | — | E | D | E | DEA | CDE | — | — | D | | E | C | DEA | DEA | |
| 29 | A,B | D,E | B,C | A,B | EAB | — | B | A | B | ABC | EAB | — | — | A | | D | B | ABC | CDE | |
| 30 | C,D | A,B | D,E | C,D | CDE | — | D | C | D | CDE | DEA | — | — | C | | E | C | CDE | CDE | EAB |
| 31 | E,A | C,D | A,B | E,A | DEA | — | A | E | A | DEA | ABC | — | — | E | | B | D | DEA | DEA | |
| 32 | B,C | E,A | C,D | B,C | ABC | — | C | B | C | ABC | CDE | — | — | B | | D | A | ABC | ABC | |
| 33 | E,A | C,D | E,A | B,C | CDE | — | — | (D) | (E) | — | — | — | — | B | | (D) | (D) | (C) | (D) | EAB | clear | ABX | EAB |
| 34 | X | E,A | A,B | clear | EAB | ABX | X | miss | miss | clear | — | — | — | — | | Update-EAB | Update-ABX | clear | clear | | ABX |
| 35 | — | X | clear | — | — | — | Y | — | — | — | — | — | — | — | — | — | — | — | — | | |
| 36 | Y | — | X | — | — | — | — | miss | | — | — | BXY | — | — | — | — | — | — | — | (BXY) | — |
| 37 | — | Y | — | X | BXY | — | — | Update-BXY | | — | — | — | BXY | — | | Update-BXY | — | — | — | — | (BXY) | |
| 38 | A | — | Y | — | — | — | A | B | C | ABC | — | XYA | — | B | | X | Y | BXY | | XYA | |
| 39 | B,C | A | — | Y | XYA | — | C | (D) | (E) | CDE | — | — | XYA | B | | Update-XYA | | | | | XYA | (YAB) |
| 40 | X,Y | B,C | A | — | — | — | Y | miss | miss | — | — | YAB | — | — | | X | Y | | | | (YAB) | |
| 41 | — | X,Y | — | — | YAB | — | — | Update-XYA | | — | — | — | XYA | | | Update-YAB | | | | | (YAB) | |

APPENDIX A-continued

| Clock | Superscalar Processor 203 | | | | | | | | Primary MBHT 701 | | | | | | | | Secondary MBHT 711 | | | | | | |
|---|---|---|---|---|---|---|---|---|---|---|---|---|---|---|---|---|---|---|---|---|---|---|---|
| | Instruction Fetch | | Processor | | | ENDOP | | | PPFAR | Outputs | | Pending Guess Q. 704 | | Update Queue 706 | | COM- | SPFAR | Outputs | | Pending Guess Q 714 | | Update Queue 716 | |
| | Address Stage | Cache/ Access | Decode | Execute | | Triple1 | Triple2 | | 702 | PBG1 721 | PBG2 722 | En- queue | De- queue | En- queue | De- queue | PARE 718 | 712 | SBG1 723 | SBG2 724 | En- queue | De- queue | En- queue | De- queue |
| Cycle | | | | | | | | | | | | | | | | | | | | | | | |
| 46 | A | — | — | X,Y | | ABX | — | | A | Update-YAB | | clear | clear | ABX | YAB | — | — | Update-ABX | | — | — | (ABX) | (ABX) |
| 47 | B,C | A | — | — | | BXY | XYA | | C | B | C | ABC | — | BXY | — | — | B | Update-XYA | | — | — | (XYA) | (XYA) |
| 48 | X,Y | B,(C) | A | — | | — | — | | Y | (D) | (E) | — | — | — | — | X≠C | A | X | Y | BXY | — | — | — |
| 49 | A,B | X,Y | B | A | | — | — | | B | A | B | UAB | — | — | — | — | X | B | X | ABX | ABX | — | — |
| 50 | X,Y | A,B | X,Y | B | | YAB | — | | Y | X | Y | BXY | YAB | (ABX) | — | B=B | A | Y | A | XYA | XYA | YAB | — |
| 51 | A,B | X,Y | A,B | X,Y | | ABX | XYA | | B | A | B | YAB | BXY | — | — | Y=Y | X | B | X | ABX | ABX | — | — |
| 52 | X,Y | A,B | X,Y | A,B | | BXY | ABX | | Y | X | Y | YAB | YAB | — | — | B=B | A | Y | A | XYA | XYA | — | — |
| 53 | A,B | X,Y | A,B | X,Y | | YAB | XYA | | B | A | B | BXY | YAB | — | — | B=B | X | B | X | ABX | ABX | — | — |
| 54 | X,Y | A,B | X,Y | A,B | | BXY | XYA | | Y | X | Y | YAB | YAB | — | — | Y=Y | A | Y | A | XYA | XYA | — | — |
| 55 | A,B | X,Y | A,B | X,Y | | YAB | ABX | | Y | A | Y | BXY | BXY | — | — | B=B | X | B | X | ABX | ABX | — | — |

Having thus described our invention, what we claim as new and desire to secure by Letters Patent is:

1. A system for simultaneously predicting a plurality of future branches based on an occurrence of a given branch instruction, comprising:
   a multibranch history table having one or more entries, each entry for storing branch addresses and target addresses for a plurality of branch instructions that executed sequentially after the given branch instruction;
   retrieving means for retrieving said stored branch and target addresses from said multibranch history table upon a next occurrence of the given branch instruction; and
   predicting means for simultaneously predicting the plurality of future branches based on said retrieved branch and target addresses.

2. The system of claim 1, further comprising:
   update means for updating said multibranch history table based on a subsequent plurality of branch instructions that executed sequentially after the branch instruction.

3. The system of claim 2, wherein said update means comprises:
   a pending guess queue to hold said retrieved branch and target addresses from said multibranch history table as a pending guess;
   an update queue to hold branch addresses and target addresses from said subsequent plurality of sequentially executed branch instructions as a potential update sequence; and
   comparison means for comparing said potential update sequence with said pending guess to determine unstored branch and target addresses of said subsequent plurality of sequentially executed branch instructions.

4. The system of claim 1, wherein said stored branch and target addresses are stored beginning at a location in said multibranch history table corresponding to a branch address of the given branch instruction.

5. The system of claim 1, wherein said retrieving means comprises a prefetch address register for retrieving said stored branch and target addresses from said multibranch history table upon a next occurrence of the given branch instruction.

6. A method for simultaneously predicting a plurality of future branches based on an occurrence of a given branch instruction, comprising the steps of:
   a) storing as an entry in a multibranch history table branch addresses and target addresses for a plurality of branch instructions that executed sequentially after the given branch instruction;
   b) retrieving said stored branch and target addresses upon a next occurrence of the given branch instruction; and
   c) simultaneously predicting the plurality of future branches based on said retrieved branch and target addresses.

7. The method of claim 6, further comprising the step of:
   d) updating said multibranch history table based on a subsequent plurality of branch instructions that executed sequentially after the branch instruction.

8. The method of claim 7, wherein said step of updating comprises the steps of:
   holding said retrieved branch and target addresses from said multibranch history table as in a pending guess queue as a pending guess;
   holding branch addresses and target addresses from said subsequent plurality of sequentially executed branch instructions in an update queue as a potential update sequence; and
   comparing said potential update sequence with said pending guess to determine unstored branch and target addresses of said subsequent plurality of sequentially executed branch instructions.

9. The method of claim 6, wherein said stored branch and target addresses are stored in a multibranch history table beginning at a location corresponding to a branch address of the given branch instruction.

10. A system for simultaneously predicting a plurality of future branches based on an occurrence of a branch instruction, comprising:
    a primary multibranch history table having one or more entries, each entry for storing branch addresses and target addresses for a first plurality of branch instructions that executed sequentially after a first branch instruction;
    secondary multibranch history table having one or more entries, each entry for storing branch addresses and target addresses for a second plurality of branch instructions that executed sequentially after a second branch instruction;
    first retrieving means for retrieving said fast stored branch and target addresses from said primary multibranch history table based on a next occurrence of the branch instruction;
    second retrieving means for retrieving said second stored branch and target addresses from said secondary multibranch history table based on said next occurrence of the branch instruction; and
    predicting means for simultaneously predicting the plurality of future branches based on said first retrieved branch and target addresses and said second retrieved branch and target addresses.

11. The system of claim 10, further comprising comparison means for comparing said first retrieved branch and target addresses with said second retrieved branch and target addresses to detect divergence between said first plurality of branch instructions and said second plurality of branch instructions, wherein said predicting means predicts the plurality of future branches based on said first retrieved branch and target addresses, said second retrieved branch and target addresses, and said divergence.

12. The system of claim 11, wherein said secondary multibranch history table is offset at least one branch instruction from said primary multibranch history table for facilitating detection of said divergence.

13. The system of claim 11, further comprising a plurality of said secondary multibranch history tables, wherein each subsequent multibranch history table is offset at least one branch instruction from each prior multibranch history table to facilitate detection of said divergence.

14. The system of claim 10, further comprising update means for updating said primary multibranch history table based on a subsequent plurality of branch instructions that executed sequentially after said first branch instruction and for updating said secondary multibranch history table based on a subsequent plurality of branch instructions that executed sequentially after said second branch instruction.

15. The system of claim 14, wherein said update means comprises:

a primary pending guess queue to hold said first retrieved branch and target addresses from said primary multibranch history table as a primary pending guess;

a secondary pending guess queue to hold said second retrieved branch and target addresses from said secondary multibranch history table as a secondary pending guess;

an update queue to hold branch addresses and target addresses from said subsequent plurality of sequentially executed branch instructions as a potential update sequence; and second comparison means for comparing said potential update sequence with said primary pending guess and said secondary pending guess to determine unstored branch and target addresses of said subsequent plurality of sequentially executed branch instructions.

16. The system of claim 10, wherein said first stored branch and target addresses for said tint plurality of branch instructions are stored beginning at a storage address in said primary multibranch history table corresponding to a branch address of said first branch instruction and said second stored branch and target addresses for said second plurality of branch instructions are stored beginning at a storage address in said secondary multibranch history table corresponding to a branch address of said second branch instruction.

17. The system of claim 10, wherein said primary multibranch history table stores branch addresses and target addresses for a first set of two branch instructions that executed sequentially after said first branch instruction, said branch and target addresses stored in said primary multibranch history table comprising a first and second primary predicted branch, and wherein said secondary multibranch history table stores branch addresses and target addresses for a second set of two branch instructions that executed sequentially after said second branch instruction, said branch and target addresses stored in said secondary multibranch history table comprising a first and second secondary predicted branch.

18. The system of claim 17, wherein said predicting means comprises:

comparing means for comparing said second primary predicted branch with said first secondary predicted branch to detect divergence between said first set of two branch instructions and said second set of two branch instructions; and selecting means for selecting the plurality of future branches from said first and second primary predicted branches if said divergence does not exist and from said second secondary predicted branch if said divergence does exist.

19. A method for simultaneously predicting a plurality of future branches based on an occurrence of a branch instruction, comprising the steps of:

a) storing as an entry in a primary multibranch history table branch addresses and target addresses for a first plurality of branch instructions that executed sequentially after a first branch instruction;

b) storing as an entry in a secondary multibranch history table branch addresses and target addresses for a second plurality of branch instructions that executed sequentially after a second branch instruction;

c) retrieving said first stored branch and target addresses from said primary multibranch history table based on a next occurrence of the branch instruction;

d) retrieving said second stored branch and target addresses from said secondary multibranch history table based on said next occurrence of the branch instruction; and e) simultaneously predicting the plurality of future branches based on said first retrieved branch and target addresses and said second retrieved branch and target addresses.

20. The method of claim 19, further comprising the step of:

f) comparing said first retrieved branch and target addresses with said second retrieved branch and target addresses to detect divergence between said first plurality of branch instructions and said second plurality of branch instructions, wherein said predicting means predicts the plurality of future branches based on said first retrieved branch and target addresses, said second retrieved branch and target addresses, and said divergence.

21. The method of claim 20, wherein said secondary multibranch history table is offset at least one branch instruction from said primary multibranch history table for facilitating detection of said divergence.

22. The method of claim 20, further comprising the step of:

g) storing as entries in a plurality of secondary multibranch history tables branch addresses and target addresses for a plurality of branch instructions that executed sequentially after a branch instruction, wherein each subsequent multibranch history table is offset at least one branch instruction from each prior multibranch history table to facilitate detection of said divergence.

23. The method of claim 19, further comprising the steps of:

f) updating said primary multibranch history table based on a subsequent plurality of branch instructions that executed sequentially after said first branch instruction; and g) updating said secondary multibranch history table based on a subsequent plurality of branch instructions that executed sequentially after said second branch instruction.

24. The method of claim 23, wherein said steps of updating comprise the steps of:

holding said first retrieved branch and target addresses from said primary multibranch history table in a primary pending guess queue as a primary pending guess;

holding said second retrieved branch and target addresses from said secondary multibranch history table in a secondary pending guess queue as a secondary pending guess;

holding branch addresses and target addresses from said subsequent plurality of sequentially executed branch instructions in an update queue as a potential update sequence; and comparing said potential update sequence with said primary pending guess and said secondary pending guess to determine unstored branch and target addresses of said subsequent plurality of sequentially executed branch instructions.

25. The method of claim 19, wherein said first stored branch and target addresses for said first plurality of branch instructions are stored beginning at a storage address in said primary multibranch history table corresponding to a branch address of said first branch instruction and said second stored branch and target addresses for said second plurality of branch instructions are stored beginning at a storage address in said secondary multibranch history table corresponding to a branch address of said second branch instruction.

26. The method of claim 19, wherein said primary multibranch history table stores branch addresses and target addresses for a first set of two branch instructions that executed sequentially after said first branch instruction, said branch and target addresses in said primary multibranch history table comprising a first and second primary predicted branch, and wherein said secondary multibranch history table stores branch addresses and target addresses for a second set of two branch instructions that executed sequentially after said second branch instruction, said branch and target addresses in said secondary multibranch history table comprising a first and second secondary predicted branch.

27. The method of claim 26, wherein said step of predicting comprises the steps of:
comparing said second primary predicted branch with said first secondary predicted branch to detect divergence between said first set of two branch instructions and said second set of two branch instructions; and
selecting the plurality of future branches from said first and second primary predicted branches if said divergence does not exist and from said second secondary predicted branch if said divergence does exist.

* * * * *